US012238076B2

(12) United States Patent
Acharya et al.

(10) Patent No.: US 12,238,076 B2
(45) Date of Patent: Feb. 25, 2025

(54) IN-LINE ENCRYPTION OF NETWORK DATA

(71) Applicant: Arista Networks, Inc., Santa Clara, CA (US)

(72) Inventors: Dipankar Bhatt Acharya, Saratoga, CA (US); Kartik Chandran, Santa Clara, CA (US); Hugh W. Holbrook, Palo Alto, CA (US); François Labonté, Menlo Park, CA (US); Sambath Kumar Balasubramanian, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 253 days.

(21) Appl. No.: 16/590,364

(22) Filed: Oct. 1, 2019

(65) Prior Publication Data
US 2021/0092103 A1    Mar. 25, 2021

Related U.S. Application Data

(60) Provisional application No. 62/740,302, filed on Oct. 2, 2018.

(51) Int. Cl.
*H04L 9/40*     (2022.01)
*H04L 12/46*    (2006.01)

(52) U.S. Cl.
CPC ...... *H04L 63/0471* (2013.01); *H04L 12/4633* (2013.01); *H04L 63/0272* (2013.01); *H04L 63/029* (2013.01); *H04L 63/08* (2013.01); *H04L 63/0428* (2013.01); *H04L 63/126* (2013.01)

(58) Field of Classification Search
None
See application file for complete search history.

(56) References Cited

U.S. PATENT DOCUMENTS 5,689,247 A  * 11/1997  Welner ............... G06Q 20/4012
                                                            705/72
5,850,446 A  * 12/1998  Berger ................ H04L 12/5692
                                                            713/153

(Continued)

FOREIGN PATENT DOCUMENTS

CN    106301765 A    1/2017
CN    106657121 A    5/2017

OTHER PUBLICATIONS

Cisco "Innovations in Ethernet Encyrption (802.1A4 MACsec) for Securing High Speed (1-100GE) WAN Deployments." White Paper, 2016, pp. 1-22 (Year: 2016).*

(Continued)

*Primary Examiner* — Luu T Pham
*Assistant Examiner* — James J Wilcox
(74) *Attorney, Agent, or Firm* — Fountainhead Law Group, PC

(57) ABSTRACT

Methods and systems for modifying network traffic data. The method of modifying network traffic data may include receiving a network traffic data unit by a switching engine; performing an analysis on the network traffic data unit to obtain network tunnel information; generating encryption information based on the network tunnel information; and securing the network traffic data unit, by an encryption engine, based on the encryption information.

19 Claims, 7 Drawing Sheets

(56) References Cited

U.S. PATENT DOCUMENTS

| | | | | |
|---|---|---|---|---|
| 5,961,591 A * | 10/1999 | Jones | G06F 21/62 | 709/227 |
| 5,983,273 A * | 11/1999 | White | H04L 63/0853 | 713/1 |
| 5,996,076 A * | 11/1999 | Rowney | G06Q 20/12 | 705/76 |
| 6,173,157 B1 * | 1/2001 | Godoroja | H04L 63/0807 | 455/433 |
| 6,219,694 B1 * | 4/2001 | Lazaridis | H04L 67/51 | 455/556.1 |
| 6,301,229 B1 * | 10/2001 | Araujo | H04Q 11/0478 | 370/252 |
| 6,400,722 B1 * | 6/2002 | Chuah | H04L 69/164 | 709/229 |
| 6,449,722 B1 * | 9/2002 | West | H04W 12/062 | 726/4 |
| 6,529,885 B1 * | 3/2003 | Johnson | G06Q 30/02 | 705/26.4 |
| 6,598,075 B1 * | 7/2003 | Ogdon | H04L 63/083 | 348/E7.083 |
| 6,618,709 B1 * | 9/2003 | Sneeringer | G06Q 30/0283 | 705/406 |
| 6,983,366 B1 * | 1/2006 | Huynh | H04L 63/0823 | 713/168 |
| 7,082,140 B1 * | 7/2006 | Hass | H04L 49/602 | 455/238.1 |
| 7,089,214 B2 * | 8/2006 | Wang | G07F 7/1025 | 705/64 |
| 7,162,649 B1 * | 1/2007 | Ide | H04L 63/102 | 709/227 |
| 7,237,260 B2 * | 6/2007 | Yu | H04L 63/0272 | 713/153 |
| 7,395,336 B1 * | 7/2008 | Santharam | H04L 67/143 | 709/227 |
| 7,418,596 B1 * | 8/2008 | Carroll | H04W 12/04 | 380/278 |
| 7,454,610 B2 * | 11/2008 | Buer | H04L 67/1001 | 713/168 |
| 7,545,735 B1 * | 6/2009 | Shabtay | H04L 45/50 | 370/405 |
| 7,577,255 B2 * | 8/2009 | Kerstens | H04L 9/40 | 380/267 |
| 7,606,936 B2 * | 10/2009 | Mousseau | H04L 9/40 | 709/239 |
| 7,690,040 B2 * | 3/2010 | Frattura | H04L 63/16 | 713/193 |
| 7,710,886 B2 * | 5/2010 | Standridge | H04L 41/145 | 370/241 |
| 7,721,084 B2 * | 5/2010 | Salminen | H04L 63/029 | 713/160 |
| 7,738,886 B1 * | 6/2010 | Connolly | H04Q 3/0029 | 455/461 |
| 7,814,329 B1 * | 10/2010 | Hutchison | H04L 63/0876 | 713/181 |
| 7,826,360 B1 * | 11/2010 | Hutchison | H04L 63/0428 | 370/254 |
| 7,904,717 B2 * | 3/2011 | Pilant | H04L 9/0838 | 713/193 |
| 7,934,254 B2 * | 4/2011 | Graham | H04L 63/1416 | 709/224 |
| 7,957,409 B2 * | 6/2011 | Golshan | H04L 69/162 | 370/386 |
| 7,962,741 B1 * | 6/2011 | Alexander | H04L 63/0485 | 713/192 |
| 8,000,344 B1 * | 8/2011 | Frick | H04L 63/162 | 725/15 |
| 8,014,317 B1 * | 9/2011 | Ghosh | H04L 12/4633 | 370/254 |
| 8,079,066 B1 * | 12/2011 | Cordell | H04L 63/083 | 713/153 |
| 8,200,971 B2 * | 6/2012 | Edwards | H04L 63/083 | 713/168 |
| 8,320,880 B2 * | 11/2012 | Fok | H04W 12/04 | 713/168 |
| 8,422,514 B1 * | 4/2013 | Kothari | H04L 12/4633 | 370/467 |
| 8,428,087 B1 * | 4/2013 | Vincent | H04L 47/2483 | 709/236 |
| 8,555,350 B1 * | 10/2013 | Shatzkamer | H04L 63/0892 | 370/335 |
| 8,613,070 B1 * | 12/2013 | Borzycki | H04L 67/104 | 726/8 |
| 8,707,020 B1 * | 4/2014 | Lengyel | H04L 63/0428 | 370/252 |
| 8,711,838 B1 * | 4/2014 | Guichard | H04L 12/4633 | 370/351 |
| 8,800,010 B2 * | 8/2014 | Hui | H04L 63/08 | 380/278 |
| 8,804,504 B1 * | 8/2014 | Chen | H04L 69/22 | 370/229 |
| 8,804,736 B1 * | 8/2014 | Drake | H04L 12/4633 | 370/392 |
| 8,838,999 B1 * | 9/2014 | Sathe | H04L 47/52 | 726/34 |
| 8,880,869 B1 * | 11/2014 | Shah | H04L 45/72 | 713/181 |
| 8,891,406 B1 * | 11/2014 | Shekhar | H04L 45/00 | 370/255 |
| 9,141,831 B2 * | 9/2015 | Mundra | H04L 9/065 | |
| 9,178,810 B1 * | 11/2015 | Singh | H04L 45/50 | |
| 9,246,820 B1 * | 1/2016 | Singh | H04L 47/125 | |
| 9,300,762 B2 * | 3/2016 | Krishnamurthy | H04L 63/0428 | |
| 9,385,596 B1 * | 7/2016 | Yang | H03K 5/159 | |
| 9,479,435 B2 * | 10/2016 | Kolbe | H04L 45/74 | |
| 9,525,671 B1 * | 12/2016 | Worsley | H04L 63/0236 | |
| 9,800,474 B1 * | 10/2017 | Bush | H04L 63/20 | |
| 9,807,121 B1 * | 10/2017 | Levy | H04L 63/0464 | |
| 10,075,418 B1 * | 9/2018 | Stancik | H04L 63/061 | |
| 10,212,138 B1 * | 2/2019 | Diamant | H04L 9/3234 | |
| 10,277,353 B1 * | 4/2019 | Grammel | H04L 41/0895 | |
| 10,285,155 B1 * | 5/2019 | Dodd-Noble | H04W 4/029 | |
| 10,299,128 B1 * | 5/2019 | Suthar | H04L 9/30 | |
| 10,326,830 B1 * | 6/2019 | Singh | H04L 41/12 | |
| 10,348,570 B1 * | 7/2019 | Hegrat | H04L 63/0272 | |
| 10,367,657 B2 * | 7/2019 | Gravel | H04L 61/00 | |
| 10,469,461 B1 * | 11/2019 | Singh | H04L 63/029 | |
| 10,491,376 B1 * | 11/2019 | Suthar | H04L 63/102 | |
| 10,491,569 B1 * | 11/2019 | Powell, III | H04L 61/2596 | |
| 10,498,711 B1 * | 12/2019 | Cassidy | G06F 21/575 | |
| 10,523,689 B2 * | 12/2019 | Decenzo | H04L 63/02 | |
| 10,708,245 B2 * | 7/2020 | Sankaran | H04L 63/0471 | |
| 10,721,218 B2 * | 7/2020 | Smith | H04L 45/42 | |
| 10,735,785 B1 * | 8/2020 | Hamrick, Jr. | H04N 21/411 | |
| 10,764,244 B1 * | 9/2020 | Mestery | H04L 63/0281 | |
| 10,785,652 B1 * | 9/2020 | Ravindranath | H04W 12/48 | |
| 10,790,977 B1 * | 9/2020 | Samid | H04L 9/50 | |
| 10,826,876 B1 * | 11/2020 | Sinn | H04L 63/162 | |
| 10,938,717 B1 * | 3/2021 | Sundararajan | H04L 45/64 | |
| 10,972,442 B1 * | 4/2021 | P N | H04L 41/147 | |
| 10,992,591 B1 * | 4/2021 | Thomas | H04L 12/4633 | |
| 10,992,652 B2 * | 4/2021 | Putatunda | H04L 63/1408 | |
| 11,297,054 B1 * | 4/2022 | Cooper | H04L 9/3242 | |
| 11,323,437 B1 * | 5/2022 | Gupta | G06F 21/606 | |
| 11,411,942 B1 * | 8/2022 | Dhammawat | H04W 12/041 | |
| 11,418,495 B2 * | 8/2022 | Browne | H04L 47/10 | |
| 11,516,086 B1 * | 11/2022 | Cherian | H04L 41/16 | |
| 11,671,451 B1 * | 6/2023 | Gupta | H04L 63/08 | 713/150 |
| 11,765,087 B1 * | 9/2023 | Balmakhtar | H04L 45/7453 | 370/392 |
| 2002/0006132 A1 * | 1/2002 | Chuah | H04L 45/00 | 370/331 |
| 2002/0009073 A1 * | 1/2002 | Furukawa | H04L 65/611 | 370/352 |
| 2002/0013902 A1 * | 1/2002 | Youstra | H04L 63/08 | 713/170 |
| 2002/0023220 A1 * | 2/2002 | Kaplan | H04L 9/3247 | 713/176 |
| 2002/0032797 A1 | 3/2002 | Xu | | |

(56) References Cited

U.S. PATENT DOCUMENTS

| | | | |
|---|---|---|---|
| 2002/0049902 A1* | 4/2002 | Rhodes | H04L 63/0823 713/153 |
| 2002/0109706 A1* | 8/2002 | Lincke | H04L 69/165 707/E17.116 |
| 2002/0124169 A1* | 9/2002 | Agrawal | H04L 63/08 380/278 |
| 2002/0176414 A1* | 11/2002 | Miki | H04L 69/168 370/392 |
| 2003/0210693 A1* | 11/2003 | Grabner | H04L 12/4633 370/392 |
| 2003/0233584 A1* | 12/2003 | Douceur | H04L 63/08 713/169 |
| 2004/0025054 A1* | 2/2004 | Xue | H04L 45/502 709/230 |
| 2004/0044739 A1* | 3/2004 | Ziegler | G07F 7/0826 709/213 |
| 2004/0081109 A1* | 4/2004 | Oishi | H04L 63/08 370/310 |
| 2004/0085951 A1* | 5/2004 | Rezaiifar | H04L 47/825 370/352 |
| 2004/0098620 A1* | 5/2004 | Shay | H04L 63/0236 713/153 |
| 2004/0123151 A1* | 6/2004 | Mizrah | H04L 63/102 726/5 |
| 2004/0123160 A1* | 6/2004 | Mizrah | H04L 63/08 726/5 |
| 2004/0139313 A1* | 7/2004 | Buer | H04L 9/40 713/150 |
| 2004/0156313 A1* | 8/2004 | Hofmeister | H04L 12/4633 370/229 |
| 2004/0170173 A1* | 9/2004 | Pan | H04L 49/602 370/395.31 |
| 2004/0213228 A1* | 10/2004 | Tingle | H04L 12/4633 370/389 |
| 2004/0225880 A1* | 11/2004 | Mizrah | G06F 21/46 713/155 |
| 2004/0259640 A1* | 12/2004 | Gentles | G06F 21/128 463/42 |
| 2004/0266533 A1* | 12/2004 | Gentles | G06F 21/32 463/42 |
| 2005/0005014 A1* | 1/2005 | Holmes | H04L 69/32 709/227 |
| 2005/0033957 A1* | 2/2005 | Enokida | H04L 63/12 726/4 |
| 2005/0055578 A1* | 3/2005 | Wright | G06F 21/32 726/4 |
| 2005/0108571 A1* | 5/2005 | Lu | H04L 63/0853 726/4 |
| 2005/0125663 A1* | 6/2005 | Funk | H04L 63/1466 713/168 |
| 2005/0128979 A1* | 6/2005 | Wu | H04W 36/0019 370/331 |
| 2005/0129019 A1* | 6/2005 | Cheriton | H04L 63/08 709/240 |
| 2005/0131583 A1* | 6/2005 | Ransom | H04L 9/3268 726/4 |
| 2005/0144437 A1* | 6/2005 | Ransom | G06F 1/28 700/286 |
| 2005/0154872 A1* | 7/2005 | McGrew | H04L 9/3226 713/150 |
| 2005/0154873 A1* | 7/2005 | Cam-Winget | H04L 63/0435 713/150 |
| 2005/0160290 A1* | 7/2005 | Moon | H04L 63/0823 726/5 |
| 2005/0177637 A1* | 8/2005 | Heron | H04L 63/029 709/227 |
| 2005/0220107 A1* | 10/2005 | DelRegno | H04L 45/66 370/392 |
| 2005/0262343 A1* | 11/2005 | Jorgensen | H04L 63/08 713/168 |
| 2005/0273850 A1* | 12/2005 | Freund | H04L 63/20 726/14 |
| 2005/0278565 A1* | 12/2005 | Frattura | H04L 63/0407 714/5.1 |
| 2006/0039382 A1* | 2/2006 | Hansen | H04L 12/2856 370/395.51 |
| 2006/0059163 A1* | 3/2006 | Frattura | H04L 43/00 |
| 2006/0075483 A1* | 4/2006 | Oberle | H04L 63/029 726/14 |
| 2006/0101262 A1* | 5/2006 | Haney | H04L 45/04 713/153 |
| 2006/0112431 A1* | 5/2006 | Finn | H04L 63/104 726/22 |
| 2006/0136715 A1* | 6/2006 | Han | H04L 9/3242 713/151 |
| 2006/0140181 A1* | 6/2006 | Trumper | H04L 69/16 370/465 |
| 2006/0206933 A1* | 9/2006 | Molen | H04L 63/0428 726/14 |
| 2006/0208882 A1* | 9/2006 | Senga | B60R 25/255 340/552 |
| 2006/0212718 A1* | 9/2006 | Senga | H04W 12/068 713/186 |
| 2006/0233166 A1* | 10/2006 | Bou-Diab | H04L 63/08 370/389 |
| 2006/0259759 A1* | 11/2006 | Maino | H04L 63/162 713/151 |
| 2006/0268818 A1* | 11/2006 | Chen | H04L 47/825 370/352 |
| 2006/0274899 A1 | 12/2006 | Zhu | |
| 2006/0288405 A1* | 12/2006 | Albisu | G06Q 20/388 726/8 |
| 2006/0294368 A1* | 12/2006 | Adams | H04W 12/02 713/176 |
| 2007/0025241 A1* | 2/2007 | Nadeau | H04L 45/04 370/241 |
| 2007/0028001 A1* | 2/2007 | Phillips | H04L 41/5003 709/230 |
| 2007/0038855 A1* | 2/2007 | Brown | H04L 63/08 713/161 |
| 2007/0074280 A1* | 3/2007 | Callaghan | H04L 63/029 726/12 |
| 2007/0110248 A1* | 5/2007 | Li | H04L 63/064 380/278 |
| 2007/0121596 A1* | 5/2007 | Kurapati | H04M 3/436 370/356 |
| 2007/0248091 A1* | 10/2007 | Khalid | H04L 63/0272 370/392 |
| 2007/0253553 A1* | 11/2007 | Abdul Rahman | G06Q 20/4014 380/259 |
| 2008/0028458 A1* | 1/2008 | Masuhiro | H04L 65/1104 726/14 |
| 2008/0034417 A1* | 2/2008 | He | H04L 63/08 726/15 |
| 2008/0037436 A1* | 2/2008 | Liu | H04L 45/50 370/241.1 |
| 2008/0052393 A1* | 2/2008 | McNaughton | H04L 63/102 709/224 |
| 2008/0052394 A1* | 2/2008 | Bugenhagen | H04L 45/28 709/224 |
| 2008/0052395 A1* | 2/2008 | Wright | H04W 4/029 709/224 |
| 2008/0052401 A1* | 2/2008 | Bugenhagen | H04L 47/11 709/227 |
| 2008/0072035 A1* | 3/2008 | Johnson | H04L 65/611 713/153 |
| 2008/0075073 A1* | 3/2008 | Swartz | H04L 63/162 370/389 |
| 2008/0098212 A1* | 4/2008 | Helms | H04N 21/26606 713/155 |
| 2008/0098464 A1* | 4/2008 | Mizrah | G06F 21/36 726/5 |
| 2008/0115203 A1* | 5/2008 | Elzur | H04L 63/0823 726/14 |
| 2008/0123555 A1* | 5/2008 | Qi | H04L 63/08 370/254 |
| 2008/0123652 A1* | 5/2008 | Akyol | H04L 12/465 370/392 |

(56) References Cited

U.S. PATENT DOCUMENTS

| | | | |
|---|---|---|---|
| 2008/0130889 A1* | 6/2008 | Qi | H04L 63/0435 380/42 |
| 2008/0141023 A1* | 6/2008 | Qi | H04L 63/0478 713/155 |
| 2008/0172366 A1* | 7/2008 | Hannel | H04L 63/20 |
| 2008/0178258 A1* | 7/2008 | Loomis | G06Q 20/401 726/2 |
| 2008/0192739 A1* | 8/2008 | Carrasco | H04L 45/00 370/389 |
| 2008/0219268 A1* | 9/2008 | Dennison | H04L 12/4633 370/395.2 |
| 2008/0239956 A1* | 10/2008 | Okholm | H04L 47/20 370/232 |
| 2008/0263363 A1* | 10/2008 | Jueneman | H04L 9/0877 713/184 |
| 2008/0304485 A1 | 12/2008 | Sinha et al. | |
| 2008/0316922 A1* | 12/2008 | Riddle | H04L 47/10 370/230 |
| 2009/0055643 A1* | 2/2009 | Brown | H04L 9/3263 713/160 |
| 2009/0113202 A1 | 4/2009 | Hidle | |
| 2009/0113203 A1* | 4/2009 | Tsuge | H04L 61/256 713/151 |
| 2009/0154461 A1* | 6/2009 | Kitani | H04L 45/66 370/392 |
| 2009/0158040 A1* | 6/2009 | Chaudhary | H04L 63/0823 713/171 |
| 2009/0193027 A1* | 7/2009 | Ahn | H04L 67/12 707/999.009 |
| 2009/0204850 A1* | 8/2009 | Zhang | H04L 63/0272 714/37 |
| 2009/0216587 A1* | 8/2009 | Dwivedi | H04W 4/02 726/5 |
| 2009/0217032 A1* | 8/2009 | Guan | H04L 63/08 380/279 |
| 2009/0222657 A1* | 9/2009 | Bender | H04W 12/069 713/156 |
| 2009/0222902 A1* | 9/2009 | Bender | H04L 63/0823 726/10 |
| 2009/0262937 A1* | 10/2009 | Hirth | H04L 9/0891 380/256 |
| 2009/0276830 A1* | 11/2009 | O'Connor | H04L 63/0428 726/3 |
| 2009/0327693 A1* | 12/2009 | Liang | H04L 49/9057 712/30 |
| 2009/0327695 A1* | 12/2009 | Molsberry | H04L 63/20 713/153 |
| 2010/0040061 A1* | 2/2010 | McGuire | H04L 45/00 370/392 |
| 2010/0049964 A1* | 2/2010 | Kondapalli | H04L 63/162 709/236 |
| 2010/0058054 A1* | 3/2010 | Irvine | H04L 63/0428 726/28 |
| 2010/0074102 A1* | 3/2010 | Mutoh | H04L 12/437 370/225 |
| 2010/0106968 A1* | 4/2010 | Mori | H04L 63/12 713/158 |
| 2010/0174901 A1* | 7/2010 | Khermosh | H04L 63/162 713/160 |
| 2010/0217882 A1* | 8/2010 | Yang | H04L 12/4633 709/229 |
| 2010/0223342 A1* | 9/2010 | Brown | H04L 51/04 709/206 |
| 2010/0271938 A1* | 10/2010 | Mutoh | H04L 12/4633 370/228 |
| 2010/0306533 A1* | 12/2010 | Phatak | H04L 63/107 713/168 |
| 2010/0312910 A1* | 12/2010 | Lin | H04L 63/0236 709/238 |
| 2010/0332822 A1* | 12/2010 | Liu | H04W 12/041 713/151 |
| 2011/0007901 A1* | 1/2011 | Ikeda | H04N 1/00347 380/270 |
| 2011/0010435 A1* | 1/2011 | Okaya | H04N 21/64322 709/219 |
| 2011/0075664 A1* | 3/2011 | Lambeth | H04L 69/325 370/390 |
| 2011/0119740 A1* | 5/2011 | Grayson | H04L 12/4641 726/5 |
| 2011/0173678 A1* | 7/2011 | Kaippallimalil | H04W 12/08 726/4 |
| 2011/0191578 A1* | 8/2011 | Hayes | H04L 63/0823 713/155 |
| 2011/0231443 A1* | 9/2011 | Hannel | H04L 63/0428 707/E17.014 |
| 2011/0238986 A1* | 9/2011 | Kherani | H04L 63/0823 713/168 |
| 2011/0238987 A1* | 9/2011 | Kherani | H04L 67/12 713/168 |
| 2011/0252228 A1* | 10/2011 | Chang | H04L 63/101 713/153 |
| 2011/0283017 A1* | 11/2011 | Alkhatib | H04L 12/4633 718/1 |
| 2011/0289565 A1* | 11/2011 | Resch | H04L 9/0869 726/5 |
| 2011/0320813 A1* | 12/2011 | Suginaka | H04L 63/08 713/168 |
| 2012/0011351 A1* | 1/2012 | Mundra | H04L 9/3242 713/192 |
| 2012/0036245 A1* | 2/2012 | Dare | H04L 65/1063 709/223 |
| 2012/0072717 A1* | 3/2012 | Hayes | H04L 63/0823 713/155 |
| 2012/0072979 A1* | 3/2012 | Cha | H04W 12/069 726/8 |
| 2012/0180136 A1* | 7/2012 | Song | H04W 12/08 726/26 |
| 2012/0183139 A1* | 7/2012 | Matsuo | H04L 63/166 380/255 |
| 2012/0207039 A1 | 8/2012 | Srinivasan | |
| 2012/0224583 A1* | 9/2012 | Sergeev | H04L 12/413 370/395.5 |
| 2012/0250682 A1* | 10/2012 | Vincent | H04L 45/74 370/392 |
| 2012/0250686 A1* | 10/2012 | Vincent | H04L 12/4633 370/392 |
| 2013/0054761 A1* | 2/2013 | Kempf | H04L 47/781 709/221 |
| 2013/0091349 A1* | 4/2013 | Chopra | H04L 45/50 713/150 |
| 2013/0091350 A1* | 4/2013 | Gluck | H04L 63/0471 713/153 |
| 2013/0103818 A1* | 4/2013 | Koponen | H04L 12/4633 709/223 |
| 2013/0114601 A1* | 5/2013 | Branscomb | H04J 3/0697 370/392 |
| 2013/0117856 A1* | 5/2013 | Branscomb | H04L 63/123 726/26 |
| 2013/0132541 A1* | 5/2013 | Falk | H04L 9/3236 709/222 |
| 2013/0191907 A1* | 7/2013 | Falk | G05B 19/0425 726/15 |
| 2013/0212378 A1* | 8/2013 | Falk | H04L 63/0428 713/155 |
| 2013/0237155 A1* | 9/2013 | Kim | G06K 7/1447 235/375 |
| 2013/0258963 A1* | 10/2013 | Mihaly | H04L 61/255 370/329 |
| 2013/0259060 A1* | 10/2013 | Liu | H04L 45/00 370/401 |
| 2013/0276058 A1* | 10/2013 | Buldas | H04L 63/0876 726/2 |
| 2013/0318570 A1* | 11/2013 | L. | H04L 63/00 726/4 |
| 2014/0007222 A1* | 1/2014 | Qureshi | H04L 67/10 726/16 |

(56) References Cited

U.S. PATENT DOCUMENTS

| | | | |
|---|---|---|---|
| 2014/0032758 A1* | 1/2014 | Barton | H04L 41/00 709/225 |
| 2014/0078936 A1* | 3/2014 | Kim | H04L 41/12 370/255 |
| 2014/0086580 A1* | 3/2014 | Griswold | H04L 12/2872 398/67 |
| 2014/0093072 A1* | 4/2014 | Biradar | H04L 63/08 380/44 |
| 2014/0107875 A1* | 4/2014 | Beyer | B61L 15/0036 701/19 |
| 2014/0119367 A1* | 5/2014 | Han | H04L 12/4633 370/389 |
| 2014/0136589 A1* | 5/2014 | Wahler | G06F 21/554 709/201 |
| 2014/0136838 A1* | 5/2014 | Mossbarger | H04L 63/0823 713/156 |
| 2014/0153572 A1* | 6/2014 | Hampel | H04L 45/64 370/392 |
| 2014/0192808 A1* | 7/2014 | Thubert | H04L 12/4633 370/392 |
| 2014/0201516 A1* | 7/2014 | Bjarnason | H04L 63/04 713/150 |
| 2014/0226820 A1* | 8/2014 | Chopra | H04L 9/0825 380/277 |
| 2014/0233412 A1* | 8/2014 | Mishra | H04W 84/02 370/252 |
| 2014/0237539 A1* | 8/2014 | Wing | H04L 63/08 726/1 |
| 2014/0241247 A1* | 8/2014 | Kempf | H04W 76/12 370/328 |
| 2014/0279640 A1* | 9/2014 | Moreno | G06Q 50/265 705/325 |
| 2014/0280889 A1* | 9/2014 | Nispel | H04L 63/1425 709/224 |
| 2014/0304500 A1* | 10/2014 | Sun | H04L 63/061 713/153 |
| 2014/0373124 A1* | 12/2014 | Rubin | H04W 12/08 726/7 |
| 2014/0376378 A1* | 12/2014 | Rubin | H04W 28/0215 370/235 |
| 2014/0376405 A1* | 12/2014 | Erickson | H04L 12/2814 370/254 |
| 2014/0376530 A1* | 12/2014 | Erickson | H04L 9/3263 370/338 |
| 2015/0010152 A1* | 1/2015 | Proulx | H04L 63/0428 380/255 |
| 2015/0016287 A1* | 1/2015 | Ganichev | H04L 43/10 370/252 |
| 2015/0030029 A1* | 1/2015 | Mohamed | H04L 63/162 370/392 |
| 2015/0063364 A1* | 3/2015 | Thakkar | H04L 12/4633 370/401 |
| 2015/0079945 A1* | 3/2015 | Rubin | H04W 28/021 455/411 |
| 2015/0098472 A1* | 4/2015 | Choi | H04L 45/74 370/392 |
| 2015/0117471 A1* | 4/2015 | Mizrahi | H04L 63/0485 370/512 |
| 2015/0120916 A1* | 4/2015 | Frattura | H04L 63/10 709/224 |
| 2015/0124823 A1* | 5/2015 | Pani | H04L 41/0836 370/392 |
| 2015/0127701 A1* | 5/2015 | Chu | H04L 45/50 709/201 |
| 2015/0150115 A1* | 5/2015 | Le Rouzic | H04L 63/029 726/14 |
| 2015/0172169 A1* | 6/2015 | DeCusatis | G06F 9/45533 718/1 |
| 2015/0207793 A1* | 7/2015 | Mohamed | H04L 63/168 726/6 |
| 2015/0237029 A1* | 8/2015 | Zhang | H04L 67/306 726/6 |
| 2015/0257003 A1* | 9/2015 | Norrman | H04L 9/3273 713/171 |
| 2015/0269374 A1* | 9/2015 | Fan | G06F 21/34 455/411 |
| 2015/0271270 A1* | 9/2015 | Edlund | H04L 12/46 709/227 |
| 2015/0281099 A1* | 10/2015 | Banavalikar | H04L 12/4641 370/230 |
| 2015/0288704 A1* | 10/2015 | Huang | H04L 63/08 726/4 |
| 2015/0319159 A1* | 11/2015 | Abdul Hameed Khan | H04W 12/065 726/7 |
| 2015/0319162 A1* | 11/2015 | Ollikainen | G06Q 30/0631 726/10 |
| 2015/0334033 A1* | 11/2015 | Wang | H04L 69/04 370/389 |
| 2015/0341326 A1* | 11/2015 | Premnath | H04L 9/3218 713/171 |
| 2015/0365409 A1* | 12/2015 | Mohamed | H04L 63/0876 713/170 |
| 2015/0365414 A1* | 12/2015 | Liang | H04W 12/069 726/7 |
| 2015/0381386 A1* | 12/2015 | Sigoure | H04L 12/4645 370/392 |
| 2015/0381531 A1* | 12/2015 | Huang | H04L 12/4645 370/401 |
| 2015/0381569 A1* | 12/2015 | Visser | H04L 63/0272 726/15 |
| 2016/0036813 A1* | 2/2016 | Wakumoto | H04L 63/0272 713/171 |
| 2016/0043996 A1* | 2/2016 | Syed Mohamed | H04L 63/04 726/1 |
| 2016/0057121 A1* | 2/2016 | Metsala | H04L 63/0823 726/4 |
| 2016/0105471 A1* | 4/2016 | Nunes | H04L 12/4641 709/228 |
| 2016/0117449 A1* | 4/2016 | Hunn | G16Z 99/00 713/193 |
| 2016/0142386 A1* | 5/2016 | Snyder, II | H04L 63/126 713/173 |
| 2016/0157274 A1* | 6/2016 | Akiyoshi | H04W 88/16 370/254 |
| 2016/0182458 A1* | 6/2016 | Shatzkamer | H04L 63/0428 713/168 |
| 2016/0205095 A1* | 7/2016 | Morel | H04L 9/3231 726/6 |
| 2016/0210209 A1* | 7/2016 | Verkaik | G06F 11/2028 |
| 2016/0218910 A1* | 7/2016 | Tee | H04L 63/029 |
| 2016/0219024 A1* | 7/2016 | Verzun | H04L 9/34 |
| 2016/0219036 A1* | 7/2016 | Devkar | H04L 9/3226 |
| 2016/0255050 A1* | 9/2016 | Grayson | H04L 63/1433 726/1 |
| 2016/0286600 A1* | 9/2016 | Faccin | H04W 76/27 |
| 2016/0301669 A1* | 10/2016 | Muma | H04L 63/0428 |
| 2016/0315853 A1* | 10/2016 | Liste | H04L 63/10 |
| 2016/0315963 A1* | 10/2016 | Fiaschi | H04L 63/123 |
| 2016/0328707 A1* | 11/2016 | Wagner | G06Q 20/322 |
| 2016/0330125 A1* | 11/2016 | Mekkattuparamban | H04L 45/32 |
| 2016/0352538 A1* | 12/2016 | Chiu | H04L 45/306 |
| 2016/0352632 A1* | 12/2016 | Nedeltchev | H04L 69/16 |
| 2016/0352633 A1* | 12/2016 | Kapadia | H04L 12/4625 |
| 2016/0352682 A1* | 12/2016 | Chang | G06F 9/45558 |
| 2016/0357957 A1* | 12/2016 | Deen | H04L 45/74 |
| 2016/0373343 A1* | 12/2016 | Lundqvist | H04L 45/24 |
| 2016/0373441 A1* | 12/2016 | Sirivara | H04L 63/0869 |
| 2016/0381699 A1* | 12/2016 | Rubin | H04L 61/5007 370/329 |
| 2017/0017907 A1* | 1/2017 | Narasimhan | H04L 63/029 |
| 2017/0026349 A1* | 1/2017 | Smith | H04L 45/38 |
| 2017/0026355 A1* | 1/2017 | Mathaiyan | H04L 63/0428 |
| 2017/0026417 A1* | 1/2017 | Ermagan | H04L 63/0428 |
| 2017/0026427 A1* | 1/2017 | Vuong | H04L 67/104 |
| 2017/0033992 A1* | 2/2017 | Dichtel | H04L 12/4675 |
| 2017/0048278 A1* | 2/2017 | Tomasso | H04L 63/0272 |
| 2017/0085372 A1* | 3/2017 | Anderson | H04L 9/088 |

(56) References Cited

U.S. PATENT DOCUMENTS

| | | | |
|---|---|---|---|
| 2017/0097841 A1* | 4/2017 | Chang | H04L 67/10 |
| 2017/0099188 A1* | 4/2017 | Chang | H04L 12/4633 |
| 2017/0104719 A1* | 4/2017 | Claes | H04L 63/145 |
| 2017/0104850 A1* | 4/2017 | Arangasamy | H04L 12/4633 |
| 2017/0104851 A1* | 4/2017 | Arangasamy | H04L 63/0428 |
| 2017/0111170 A1* | 4/2017 | Baghdasaryan | H04L 9/0866 |
| 2017/0126503 A1* | 5/2017 | Tsubouchi | H04L 41/342 |
| 2017/0142064 A1* | 5/2017 | Weis | H04L 63/061 |
| 2017/0142096 A1* | 5/2017 | Reddy | H04L 12/1827 |
| 2017/0169227 A1* | 6/2017 | Rajcan | G06F 9/4416 |
| 2017/0171163 A1* | 6/2017 | Gareau | H04L 9/0637 |
| 2017/0186260 A1* | 6/2017 | Bermúdez | H04L 63/0853 |
| 2017/0214549 A1* | 7/2017 | Yoshino | H04L 12/4641 |
| 2017/0222809 A1* | 8/2017 | Takahashi | H04L 63/0861 |
| 2017/0244645 A1* | 8/2017 | Edsall | H04L 47/70 |
| 2017/0257260 A1* | 9/2017 | Govindan | H04L 12/4633 |
| 2017/0302569 A1* | 10/2017 | Ramaswamy | H04L 67/10 |
| 2017/0323116 A1* | 11/2017 | Mumford | H04L 9/3226 |
| 2017/0324566 A1* | 11/2017 | Kawasaki | H04L 9/006 |
| 2017/0325113 A1* | 11/2017 | Markopoulou | H04L 67/75 |
| 2017/0346731 A1* | 11/2017 | Pukhraj Jain | H04L 45/38 |
| 2017/0359317 A1* | 12/2017 | Anderson | H04L 9/14 |
| 2017/0366395 A1* | 12/2017 | Goldfarb | H04L 67/01 |
| 2017/0366416 A1* | 12/2017 | Beecham | H04L 45/50 |
| 2017/0366508 A1* | 12/2017 | Saraf | H04L 63/0272 |
| 2018/0007557 A1* | 1/2018 | Lee | H04L 67/12 |
| 2018/0013583 A1* | 1/2018 | Rubenstein | H04L 45/64 |
| 2018/0013798 A1* | 1/2018 | Pallas | H04L 12/4641 |
| 2018/0026812 A1* | 1/2018 | Verkaik | H04L 47/193 709/223 |
| 2018/0026874 A1* | 1/2018 | Usman | H04L 45/24 370/392 |
| 2018/0026884 A1* | 1/2018 | Nainar | H04L 41/00 370/392 |
| 2018/0063036 A1* | 3/2018 | Chandrashekhar | G06F 15/177 |
| 2018/0063176 A1* | 3/2018 | Katrekar | H04L 43/10 |
| 2018/0063193 A1* | 3/2018 | Chandrashekhar | G06F 11/2035 |
| 2018/0084021 A1* | 3/2018 | Rubin | H04L 65/60 |
| 2018/0091446 A1* | 3/2018 | Zhang | H04L 45/74 |
| 2018/0097656 A1* | 4/2018 | Knutsen | H04L 63/062 |
| 2018/0097722 A1* | 4/2018 | Callard | H04L 12/4641 |
| 2018/0102918 A1* | 4/2018 | Amini | G01S 5/0294 |
| 2018/0115548 A1* | 4/2018 | Edsall | H04L 12/462 |
| 2018/0123828 A1* | 5/2018 | Zhang | H04L 12/4633 |
| 2018/0145952 A1* | 5/2018 | Falk | G06F 21/60 |
| 2018/0145981 A1* | 5/2018 | Du | H04L 63/126 |
| 2018/0152442 A1* | 5/2018 | Buldas | H04L 9/3297 |
| 2018/0167232 A1* | 6/2018 | Käslin | H04L 12/66 |
| 2018/0167307 A1* | 6/2018 | Barry | H04L 45/7452 |
| 2018/0232817 A1* | 8/2018 | Isaacson | G06F 3/048 |
| 2018/0248713 A1* | 8/2018 | Zanier | H04L 12/4633 |
| 2018/0254919 A1* | 9/2018 | Van De Velde | H04L 12/462 |
| 2018/0255138 A1* | 9/2018 | Hall | H04L 43/08 |
| 2018/0262388 A1* | 9/2018 | Johnson | H04L 63/0823 |
| 2018/0287818 A1* | 10/2018 | Goel | H04Q 11/0005 |
| 2018/0287965 A1* | 10/2018 | Sindhu | H04L 45/243 |
| 2018/0293367 A1* | 10/2018 | Urman | G06F 21/32 |
| 2018/0302269 A1* | 10/2018 | Sankaran | H04L 63/162 |
| 2018/0309595 A1* | 10/2018 | Ma | H04L 12/4641 |
| 2018/0314847 A1* | 11/2018 | Yeo | G06F 21/6227 |
| 2018/0337889 A1* | 11/2018 | Panchapakesan | H04L 9/14 |
| 2018/0367288 A1* | 12/2018 | Vrzic | H04W 76/12 |
| 2018/0375842 A1* | 12/2018 | Aschauer | H04L 63/0227 |
| 2018/0375866 A1* | 12/2018 | Hillis | H04L 63/062 |
| 2019/0007381 A1* | 1/2019 | Isaacson | G06Q 20/12 |
| 2019/0013965 A1* | 1/2019 | Sindhu | H04L 12/4633 |
| 2019/0028424 A1* | 1/2019 | Mittal | H04L 45/74 |
| 2019/0036736 A1* | 1/2019 | Gao | H04L 12/4633 |
| 2019/0068564 A1* | 2/2019 | Putatunda | H04L 63/08 |
| 2019/0081930 A1* | 3/2019 | Hunt, IV | H04L 45/22 |
| 2019/0097745 A1 | 3/2019 | Mallela | |
| 2019/0104207 A1* | 4/2019 | Goel | H04L 45/64 |
| 2019/0110214 A1* | 4/2019 | Shen | H04W 76/12 |
| 2019/0110238 A1* | 4/2019 | Buckley | H04W 36/36 |
| 2019/0116165 A1* | 4/2019 | Polak | H04L 63/068 |
| 2019/0116183 A1* | 4/2019 | Hussain | H04L 63/08 |
| 2019/0123994 A1* | 4/2019 | Zhang | H04L 45/16 |
| 2019/0124055 A1* | 4/2019 | Guo | H04L 63/0471 |
| 2019/0132296 A1* | 5/2019 | Jiang | H04L 69/22 |
| 2019/0132314 A1* | 5/2019 | Haravu | H04L 63/0823 |
| 2019/0140826 A1* | 5/2019 | Carrel | H04L 9/0827 |
| 2019/0141021 A1* | 5/2019 | Isaacson | G06Q 30/0635 |
| 2019/0141022 A1* | 5/2019 | Reeve | G06F 21/31 |
| 2019/0158279 A1* | 5/2019 | Chimakurthy | H04L 63/0442 |
| 2019/0158347 A1* | 5/2019 | Tee | H04L 41/22 |
| 2019/0158985 A1* | 5/2019 | Dao | H04W 28/04 |
| 2019/0166134 A1* | 5/2019 | Tzeng | H04L 63/20 |
| 2019/0173856 A1* | 6/2019 | Gareau | H04L 9/3215 |
| 2019/0173860 A1* | 6/2019 | Sankaran | H04L 9/3273 |
| 2019/0190892 A1* | 6/2019 | Menachem | G06F 21/602 |
| 2019/0190910 A1* | 6/2019 | Min | H04L 63/10 |
| 2019/0191330 A1* | 6/2019 | Dao | H04L 12/4633 |
| 2019/0199449 A1* | 6/2019 | Loprieno | H04L 63/0428 |
| 2019/0199679 A1* | 6/2019 | Kottapalli | H04L 63/164 |
| 2019/0207915 A1* | 7/2019 | Schaap | H04L 9/3234 |
| 2019/0230065 A1* | 7/2019 | Panchapakesan | H04L 63/029 |
| 2019/0230087 A1* | 7/2019 | Gharout | H04W 12/35 |
| 2019/0230675 A1* | 7/2019 | Papa | H04W 40/04 |
| 2019/0253274 A1* | 8/2019 | Van Dussen | H04L 12/4641 |
| 2019/0253403 A1* | 8/2019 | Li | H04L 9/3226 |
| 2019/0253774 A1* | 8/2019 | Grammel | H04Q 11/0062 |
| 2019/0268767 A1* | 8/2019 | Wu | H04L 63/162 |
| 2019/0281031 A1* | 9/2019 | Pothula | H04L 9/0838 |
| 2019/0288803 A1* | 9/2019 | Langenbach | H04L 1/0045 |
| 2019/0288873 A1* | 9/2019 | Camarillo Garvia | H04L 45/74 |
| 2019/0288874 A1* | 9/2019 | White | H04L 67/04 |
| 2019/0306133 A1* | 10/2019 | Allan | H04L 63/0457 |
| 2019/0306166 A1* | 10/2019 | Konda | H04W 12/73 |
| 2019/0334813 A1* | 10/2019 | Raj | H04L 41/122 |
| 2019/0342101 A1* | 11/2019 | Hayes | H04L 63/1458 |
| 2019/0354685 A1* | 11/2019 | Tomasso | G06F 21/554 |
| 2019/0379572 A1* | 12/2019 | Yadav | H04L 41/12 |
| 2019/0386824 A1* | 12/2019 | Havaralu Rama Chandra Adiga | H04L 63/061 |
| 2019/0394027 A1* | 12/2019 | Falk | G06F 21/577 |
| 2020/0004442 A1* | 1/2020 | Caswell | G06F 3/0659 |
| 2020/0007495 A1* | 1/2020 | Balamurugan | H04L 69/22 |
| 2020/0014638 A1* | 1/2020 | Chen | H04L 45/74 |
| 2020/0028711 A1* | 1/2020 | Janakiraman | H04L 63/162 |
| 2020/0029205 A1* | 1/2020 | Hu | H04L 63/08 |
| 2020/0036796 A1* | 1/2020 | Tollet | H04L 12/4633 |
| 2020/0044694 A1* | 2/2020 | Park | H04B 5/79 |
| 2020/0052876 A1* | 2/2020 | Kilian | H04L 9/3247 |
| 2020/0053083 A1* | 2/2020 | Kunz | H04L 63/0892 |
| 2020/0059761 A1* | 2/2020 | Li | H04W 4/24 |
| 2020/0059780 A1* | 2/2020 | Hess | H04W 12/041 |
| 2020/0067943 A1* | 2/2020 | Falk | H04W 12/08 |
| 2020/0068391 A1* | 2/2020 | Liu | H04W 12/06 |
| 2020/0076524 A1* | 3/2020 | Demchenko | H04J 3/0667 |
| 2020/0076767 A1* | 3/2020 | Venaas | H04L 45/22 |
| 2020/0120022 A1* | 4/2020 | Stammers | H04L 12/4633 |
| 2020/0120132 A1* | 4/2020 | Fages-Tafanelli | H04L 63/0876 |
| 2020/0120134 A1* | 4/2020 | Hill | H04L 63/0485 |
| 2020/0127978 A1* | 4/2020 | Sakagami | H04L 69/324 |
| 2020/0127983 A1* | 4/2020 | Asghar | H04L 9/0819 |
| 2020/0127987 A1* | 4/2020 | Sharma | H04L 69/22 |
| 2020/0128469 A1* | 4/2020 | Akhavain Mohammadi | H04L 45/50 |
| 2020/0143088 A1* | 5/2020 | Sunkavalli | H04L 63/0428 |
| 2020/0145321 A1* | 5/2020 | Pignataro | H04L 45/64 |
| 2020/0146077 A1* | 5/2020 | Li | H04W 76/10 |
| 2020/0153871 A1* | 5/2020 | Lei | H04W 12/06 |
| 2020/0159603 A1* | 5/2020 | Panda | H04L 43/0817 |
| 2020/0162270 A1* | 5/2020 | Du | H04L 63/0428 |
| 2020/0162431 A1* | 5/2020 | Goldschlag | H04L 9/3218 |
| 2020/0162917 A1* | 5/2020 | Anantha | H04W 12/069 |
| 2020/0177503 A1* | 6/2020 | Hooda | H04L 12/4641 |
| 2020/0177632 A1* | 6/2020 | Han | H04L 63/10 |
| 2020/0177654 A1* | 6/2020 | Mittal | H04L 65/611 |
| 2020/0178076 A1* | 6/2020 | Ben Henda | H04W 12/0471 |
| 2020/0186447 A1* | 6/2020 | Song | H04L 45/745 |
| 2020/0186507 A1* | 6/2020 | Dhanabalan | H04L 63/0272 |

(56) References Cited

U.S. PATENT DOCUMENTS

| | | | |
|---|---|---|---|
| 2020/0195616 A1* | 6/2020 | Edgar | H04L 63/102 |
| 2020/0195619 A1* | 6/2020 | Iwata | H04L 12/2803 |
| 2020/0204591 A1* | 6/2020 | Yang | H04L 63/0428 |
| 2020/0213152 A1* | 7/2020 | Choquette | H04L 63/029 |
| 2020/0220843 A1* | 7/2020 | Hill | H04L 63/162 |
| 2020/0244082 A1* | 7/2020 | Chai | H04L 63/0876 |
| 2020/0252217 A1* | 8/2020 | Mathieu | H04L 9/0643 |
| 2020/0259896 A1* | 8/2020 | Sachs | H04W 56/0065 |
| 2020/0267243 A1* | 8/2020 | Trossen | H04L 69/168 |
| 2020/0267623 A1* | 8/2020 | Altay | H04L 45/64 |
| 2020/0287737 A1* | 9/2020 | Mishra | H04L 47/15 |
| 2020/0314144 A1* | 10/2020 | Gaál | H04L 63/126 |
| 2020/0322268 A1* | 10/2020 | Thoria | H04L 45/507 |
| 2020/0322383 A1* | 10/2020 | Filsfils | H04L 41/0668 |
| 2020/0351085 A1* | 11/2020 | Coyle | H04L 63/0869 |
| 2020/0358764 A1* | 11/2020 | Hojilla Uy | H04L 9/0866 |
| 2020/0366651 A1* | 11/2020 | Gupta | H04L 63/162 |
| 2020/0366686 A1* | 11/2020 | Gaál | H04L 63/123 |
| 2020/0367296 A1* | 11/2020 | Zhu | H04L 67/14 |
| 2020/0382471 A1* | 12/2020 | Janakiraman | H04L 61/5007 |
| 2020/0382519 A1* | 12/2020 | Barton | H04L 63/20 |
| 2020/0389469 A1* | 12/2020 | Litichever | H04W 4/40 |
| 2020/0402049 A1* | 12/2020 | Pi Farias | G06Q 20/208 |
| 2020/0403978 A1* | 12/2020 | Allen | H04L 63/045 |
| 2021/0011781 A1* | 1/2021 | Wan | G06F 9/5072 |
| 2021/0021579 A1* | 1/2021 | Thorslund | H04L 63/0464 |
| 2021/0029087 A1* | 1/2021 | Uy | H04L 43/062 |
| 2021/0036987 A1* | 2/2021 | Mishra | H04L 61/2592 |
| 2021/0044454 A1* | 2/2021 | Xu | H04L 49/351 |
| 2021/0044565 A1* | 2/2021 | Moreno | H04L 45/745 |
| 2021/0058784 A1* | 2/2021 | Kedalagudde | H04W 76/12 |
| 2021/0067329 A1* | 3/2021 | Coyle | H04L 9/0891 |
| 2021/0091935 A1* | 3/2021 | Bush | H04L 9/0852 |
| 2021/0092103 A1* | 3/2021 | Acharya | H04L 63/0272 |
| 2021/0112127 A1* | 4/2021 | Zhu | H04L 69/321 |
| 2021/0112409 A1* | 4/2021 | Rune | H04W 12/06 |
| 2021/0152554 A1* | 5/2021 | Taft | H04L 41/0895 |
| 2021/0168174 A1* | 6/2021 | Falk | H04W 12/10 |
| 2021/0168661 A1* | 6/2021 | Wong | H04L 61/5014 |
| 2021/0184914 A1* | 6/2021 | Myneni | H04L 69/22 |
| 2021/0203598 A1* | 7/2021 | Kompella | H04L 69/22 |
| 2021/0211279 A1* | 7/2021 | Nix | H04L 67/34 |
| 2021/0218752 A1* | 7/2021 | Fischer | H04L 63/123 |
| 2021/0227492 A1* | 7/2021 | Wang | H04L 45/42 |
| 2021/0235268 A1* | 7/2021 | Wu | H04W 12/03 |
| 2021/0306853 A1* | 9/2021 | Gundavelli | H04W 36/0038 |
| 2021/0321258 A1* | 10/2021 | Salkintzis | H04W 12/06 |
| 2021/0329460 A1* | 10/2021 | Liao | H04W 12/37 |
| 2021/0352047 A1* | 11/2021 | Singh | H04L 61/2592 |
| 2021/0392469 A1* | 12/2021 | Wang | H04L 12/189 |
| 2021/0409405 A1* | 12/2021 | Salajegheh | H04L 63/0807 |
| 2022/0007184 A1* | 1/2022 | Ferdi | H04W 48/18 |
| 2022/0021605 A1* | 1/2022 | Bagwell | H04L 45/586 |
| 2022/0029800 A1* | 1/2022 | Sergeev | H04L 9/0891 |
| 2022/0030428 A1* | 1/2022 | Li | H04W 12/69 |
| 2022/0030429 A1* | 1/2022 | Lei | H04L 63/0892 |
| 2022/0038869 A1* | 2/2022 | Avetoom | H04W 12/71 |
| 2022/0052989 A1* | 2/2022 | Zhao | H04L 63/08 |
| 2022/0052992 A1* | 2/2022 | Zhang | H04W 12/084 |
| 2022/0078047 A1* | 3/2022 | Yao | H04W 4/08 |
| 2022/0086145 A1* | 3/2022 | Lei | H04W 12/72 |
| 2022/0086218 A1* | 3/2022 | Sabella | H04M 15/66 |
| 2022/0086236 A1* | 3/2022 | Zhang | H04L 67/146 |
| 2022/0095111 A1* | 3/2022 | Fu | H04W 36/0011 |
| 2022/0116770 A1* | 4/2022 | Li | H04L 63/0861 |
| 2022/0124091 A1* | 4/2022 | Corona | H04L 67/303 |
| 2022/0131941 A1* | 4/2022 | Rönneke et al. | H04L 12/4633 |
| 2022/0132413 A1* | 4/2022 | Hu | H04W 48/18 |
| 2022/0141664 A1* | 5/2022 | Huang | H04W 12/03 726/3 |
| 2022/0150166 A1* | 5/2022 | Yang | H04L 12/4633 |
| 2022/0159750 A1* | 5/2022 | Song | H04W 76/11 |
| 2022/0174038 A1* | 6/2022 | Yu | H04L 45/74 |
| 2022/0174488 A1* | 6/2022 | Lei | H04W 24/08 |
| 2022/0182804 A1* | 6/2022 | Han | H04L 45/50 |
| 2022/0183088 A1* | 6/2022 | Huang | H04W 76/32 |
| 2022/0191685 A1* | 6/2022 | Hu | H04L 9/3247 |
| 2022/0210850 A1* | 6/2022 | Ke | H04L 45/28 |
| 2022/0224684 A1* | 7/2022 | Schultz | H04W 76/11 |
| 2022/0232460 A1* | 7/2022 | Fu | H04W 12/10 |
| 2022/0248363 A1* | 8/2022 | Ryu | H04W 60/06 |
| 2022/0263672 A1* | 8/2022 | Zhang | H04L 63/10 |
| 2022/0264503 A1* | 8/2022 | Starsinic | H04W 8/20 |
| 2022/0279348 A1* | 9/2022 | Youn | H04W 12/06 |
| 2022/0295577 A1* | 9/2022 | Yao | H04W 76/10 |
| 2022/0338110 A1* | 10/2022 | Balmakhtar | H04W 76/12 |
| 2022/0345894 A1* | 10/2022 | Aghili | H04W 12/06 |
| 2022/0353680 A1* | 11/2022 | Hu | H04W 12/069 |
| 2022/0377079 A1* | 11/2022 | Ingerman | H04L 63/1433 |
| 2022/0377547 A1* | 11/2022 | Guo | H04W 12/06 |
| 2022/0377819 A1* | 11/2022 | Zhou | H04W 76/11 |
| 2022/0386120 A1* | 12/2022 | Kim | H04W 48/08 |
| 2022/0394595 A1* | 12/2022 | Zhu | H04W 48/18 |
| 2022/0400123 A1* | 12/2022 | Ayoub | G06F 3/067 |
| 2022/0407870 A1* | 12/2022 | Vega | H04L 61/4511 |
| 2022/0408255 A1* | 12/2022 | Howe | H04W 12/062 |
| 2023/0036645 A1* | 2/2023 | Qiao | H04W 76/12 |
| 2023/0042442 A1* | 2/2023 | Kim | H04L 63/0876 |
| 2023/0044476 A1* | 2/2023 | Lei | H04L 63/0807 |
| 2023/0049810 A1* | 2/2023 | Zhang | H04L 67/51 |
| 2023/0064433 A1* | 3/2023 | Mao | H04W 28/065 |
| 2023/0066604 A1* | 3/2023 | Huang | H04L 9/40 |
| 2023/0074886 A1* | 3/2023 | Armleder | G06F 21/64 |
| 2023/0077391 A1* | 3/2023 | Guo | H04W 12/106 726/26 |
| 2023/0109272 A1* | 4/2023 | Ryu | H04L 63/0892 370/329 |
| 2023/0112305 A1* | 4/2023 | Kaur | H04W 12/06 455/411 |
| 2023/0133187 A1* | 5/2023 | Ferdi | H04W 12/068 455/411 |
| 2023/0137255 A1* | 5/2023 | Mestery | H04L 63/0485 713/151 |
| 2023/0164066 A1* | 5/2023 | Zhu | H04W 40/02 709/238 |
| 2023/0164241 A1* | 5/2023 | Filippou | H04L 63/08 709/201 |
| 2023/0189192 A1* | 6/2023 | Talebi Fard | H04W 12/088 726/4 |
| 2023/0224300 A1* | 7/2023 | Zhang | H04L 63/0892 726/4 |
| 2023/0246839 A1* | 8/2023 | Mathieu | H04L 9/0866 713/186 |
| 2023/0246950 A1* | 8/2023 | Kaimal | H04L 63/062 709/223 |
| 2023/0254694 A1* | 8/2023 | Ryu | H04W 76/30 455/411 |
| 2023/0283475 A1* | 9/2023 | Jiang | H04W 12/122 713/155 |
| 2023/0300210 A1* | 9/2023 | Wang | H04L 67/146 709/203 |
| 2023/0300665 A1* | 9/2023 | Solanki | H04L 45/302 709/238 |
| 2023/0300772 A1* | 9/2023 | Guo | H04W 12/71 455/435.1 |
| 2023/0319635 A1* | 10/2023 | Kang | H04M 15/66 370/235 |
| 2023/0334172 A1* | 10/2023 | Ke | H04L 63/0471 |
| 2023/0336381 A1* | 10/2023 | Trujillo | H04L 12/12 |
| 2023/0336992 A1* | 10/2023 | Kim | H04W 12/069 |
| 2023/0362637 A1* | 11/2023 | Thiebaut | H04W 12/63 |
| 2023/0396557 A1* | 12/2023 | Pazhyannur | H04L 63/0892 |
| 2023/0412687 A1* | 12/2023 | Kim | H04L 9/0891 |
| 2023/0413212 A1* | 12/2023 | De Foy | H04W 4/46 |
| 2024/0007330 A1* | 1/2024 | Kim | H04L 45/54 |
| 2024/0031798 A1* | 1/2024 | Zhu | H04L 63/0892 |
| 2024/0040472 A1* | 2/2024 | Satyanarayana | H04W 40/28 |
| 2024/0048986 A1* | 2/2024 | Liu | H04W 12/06 |
| 2024/0056446 A1* | 2/2024 | Castellanos Zamora | H04L 69/08 |
| 2024/0056807 A1* | 2/2024 | Yang | H04W 12/06 |
| 2024/0064042 A1* | 2/2024 | Trujillo | H04L 45/76 |
| 2024/0073010 A1* | 2/2024 | Ganguly | G06N 10/00 |

(56) References Cited

U.S. PATENT DOCUMENTS

| | | | |
|---|---|---|---|
| 2024/0073672 A1* | 2/2024 | Bi | H04W 8/14 |
| 2024/0073691 A1* | 2/2024 | Lehtovirta | H04W 12/106 |
| 2024/0129730 A1* | 4/2024 | Guo | H04W 12/37 |
| 2024/0137765 A1* | 4/2024 | Jost | H04W 12/069 |
| 2024/0154820 A1* | 5/2024 | Groth | H04L 9/3252 |
| 2024/0195879 A1* | 6/2024 | Sabella | H04L 67/51 |
| 2024/0214282 A1* | 6/2024 | Ding | H04L 41/5054 |
| 2024/0214365 A1* | 6/2024 | Li | H04L 9/0891 |
| 2024/0223548 A1* | 7/2024 | Xu | H04W 12/06 |
| 2024/0224158 A1* | 7/2024 | Zhang | H04L 45/566 |
| 2024/0244042 A1* | 7/2024 | Khan | H04L 51/063 |
| 2024/0244455 A1* | 7/2024 | Chen | H04W 24/02 |
| 2024/0267783 A1* | 8/2024 | Howe | H04L 47/2408 |
| 2024/0276217 A1* | 8/2024 | Wang | H04W 12/069 |
| 2024/0340709 A1* | 10/2024 | Li | H04W 28/24 |

OTHER PUBLICATIONS

Cisco (Cisco IOS VPN Configuration Guide, pp. 1-131, 2005) (Year: 2005).*
Wilson et al "Improving Security in a Virtual Network by Using Attribute Based Encryption Algorithm," 2016 International Conference on Circuit, Power and Computing Technologies [ICCPCT], pp. 1-6 (Year: 2016).*
Chiquito (Decrypting IPSec VPN Traffic, Mar. 6, 2018, pp. 1-8, retrieved from https://www.linkedin.com/pulse/decrypting-ipsec-vpn-traffic-paulo-chiquito?articleId=6368187318104313856) (Year: 2018).*
Li et al "Mimic Encryption System for Network Security," vol. 6, 2018, pp. 1-20, IEEE Access (Year: 2018).*
Choi et al "MACsec Extension over Software-Defined Networks for In-Vehicle Secure Communication," IEEE, ICUFN 2018, pp. 180-185 (Year: 2018).*
Wahid et al "Maximizing Ethernet Security by Switch-based Single Secure Domain," 2010 Seventh International Conference on Information Technology, IEEE Computer Society, pp. 774-778 (Year: 2010).*
Mizrahi "Time Synchronization Security using IPsec and MACsec," IEEE, pp. 1-6 (Year: 2011).*
Wahid "Maximizing Ethernet Security by Switch-based Single Secure Domain," 2010 Seventh International Conference on Information Technology, IEEE Computer Society, pp. 774-778 (Year: 2010).*
Tennekoon et al "On the Effectiveness of IP-Routable Entire-Packet Encryption Service Over Public Networks," IEEE Access, pp. 73170-73179 (Year: 2018).*
Nagashima et al "A Repeater Encryption Unit for IPv4 and IPv6,": IEEE, pp. 335-340 (Year: 2005).*
Zhou et al "An Encryption Algorithm Based on Multi-Connection Transmission," 2017 17th IEEE International Conference on Communication Technology, IEEE, pp. 1296-1300 (Year: 2017).*
Huda et al "Secure Data Exchange using Authenticated Ciphertext-Policy Attributed-Based Encryption," 2015 International Electronics Symposium, IEEE, pp. 134-139, (Year: 2015).*
Aweya, "Introduction to Switch/Router Archtiectures: Shared-Bus and Shared-Memory Based Systems," First Edition, IEEE, John Wiley & Sons, pp. 1-15 (Year: 2018).*
Tennekoon et al "On the Effectiveness of IP-Routable Entire-Packet Encryption Service Over Putblic Networks," IEEE, Pagers 73170-73179 (Year: 2018).*
International Search Report issued in corresponding Application No. PCT/US2019/054340, mailed on Jan. 13, 2020.
Written Opinion issued in corresponding Application No. PCT/US2019/054340, mailed on Jan. 13, 2020.
"IEEE Standard for Local and Metropolitan Area Networks: Media Access Control (MAC) Security"; IEEE Computer Society, IEEE; 2006; https://ieeexplore.ieee.org/document/1678345.
"Special-Purpose Multiprotocol Label Switching (MPLS) Label Values"; IANA; Nov. 8, 2002; https://www.iana.org/assignments/mpls-label-values/mpls-label-values.xhtml.
A. Farrel et al.; "Opportunistic Security in MPLS Networks"; Network Working Group; Internet-Draft; Mar. 28, 2017.
A. Huttunen et al.; "UDP Encapsulation of IPsec ESP Packets"; Network Working Group, RFC 3948; Jan. 2005.
C. Filsfils et al.; "Segment Routing Architecture"; IETF, RFC 8402, Jul. 2018.
C. Kaufman et al.; "Internet Key Exchange Protocol Version 2 (IKEv2)"; Internet Engineering Task Force (IETF), RFC 7296; Oct. 2014.
C. Kaufman; "Internet Key Exchange (IKEv2) Protocol"; Network Working Group, RFC 4306; Dec. 2005.
D. Piper; "The Internet IP Security Domain of Interpretation for ISAKMP"; Network Working Group, RFC 2407; Nov. 1998.
E. Rosen et al.; "MPLS Label Stack Encoding"; Network Working Group, RFC 3032; Jan. 2001.
E. Rosen et al.; "Multiprotocol Label Switching Architecture"; Network Working Group, RFC 3031; Jan. 2001.
International Search Report issued in corresponding Application No. PCT/US2019/054344, mailed on Dec. 5, 2019.
J. Viega et al.; "The Use of Galois/Counter Mode (GCM) in IPsec Encapsulating Security Payload (ESP)"; Network Working Group, RFC 4106; Jun. 2005.
K. Kompella et al.; "Allocating and Retiring Special-Purpose MPLS Labels"; Internet Engineering Task Force (IETF), RFC 7274; Jun. 2014.
M. Mahalingam et al.; "Virtual extensible Local Area Network (VXLAN): A Framework for Overlaying Virtualized Layer 2 Networks over Layer 3 Networks"; Independent Submission, RFC 7348; Aug. 2014.
S. Kent; "IP Encapsulating Security Payload (ESP)"; Network Working Group, RFC 4303; Dec. 2005.
Written Opinion issued in corresponding Application No. PCT/US2019/054344, mailed on Dec. 5, 2019.

* cited by examiner

IN-LINE ENCRYPTION OF NETWORK DATA

CROSS REFERENCE TO RELATED APPLICATIONS

This patent application claims the benefit of U.S. Provisional Patent Application Ser. No. 62/740,302 filed on Oct. 2, 2018 under 35 U.S.C. § 119(e). U.S. Provisional Patent Application Ser. No. 62/740,302 is incorporated herein by reference in its entirety.

BACKGROUND

Certain forms of encryption and decryption may be relatively slow to encrypt and/or decrypt network traffic that uses the Internet Protocol (IP). Accordingly, specialized methods of encryption may be necessary to improve the efficiency of such encryption.

SUMMARY

In general, in one aspect, one or more embodiments relate to a method for modifying network traffic data. The method may include: receiving a network traffic data unit by a switching engine; performing an analysis on the network traffic data unit to obtain network tunnel information; generating encryption information based on the network tunnel information; and securing the network traffic data unit, by an encryption engine, based on the encryption information.

In general, in one aspect, one or more embodiments relate to a method for modifying network traffic data. The method may include: receiving an encrypted network traffic data unit, by a decryption engine, comprising: network tunnel information; and decryption information; obtaining an encryption type based on the decryption information; decrypting the encrypted network traffic data unit to obtain a decrypted network traffic data unit, based on the encryption type; and generating post-decryption information based on the decrypting.

In general, in one aspect, one or more embodiments relate to a system for modifying network traffic data. The system may include: a switching engine, configured to: receive a network traffic data unit; perform an analysis on the network traffic data unit to obtain network tunnel information; and generate encryption information based on the network tunnel information; and an encryption engine, configured to: secure the network traffic data unit based on the encryption information.

In general, in one aspect, one or more embodiments relate to a system for modifying network traffic data. The system may include: a decryption engine, configured to: receive an encrypted network traffic data unit, comprising: network tunnel information; and decryption information; obtain an encryption type based on the decryption information; decrypt the encrypted network traffic data unit to obtain a decrypted network traffic data unit, based on the encryption type; and generate post-decryption information based on the decrypted network traffic data unit.

Other aspects of the embodiments disclosed herein will be apparent from the following description and the appended claims.

DETAILED DESCRIPTION

Figure 1:
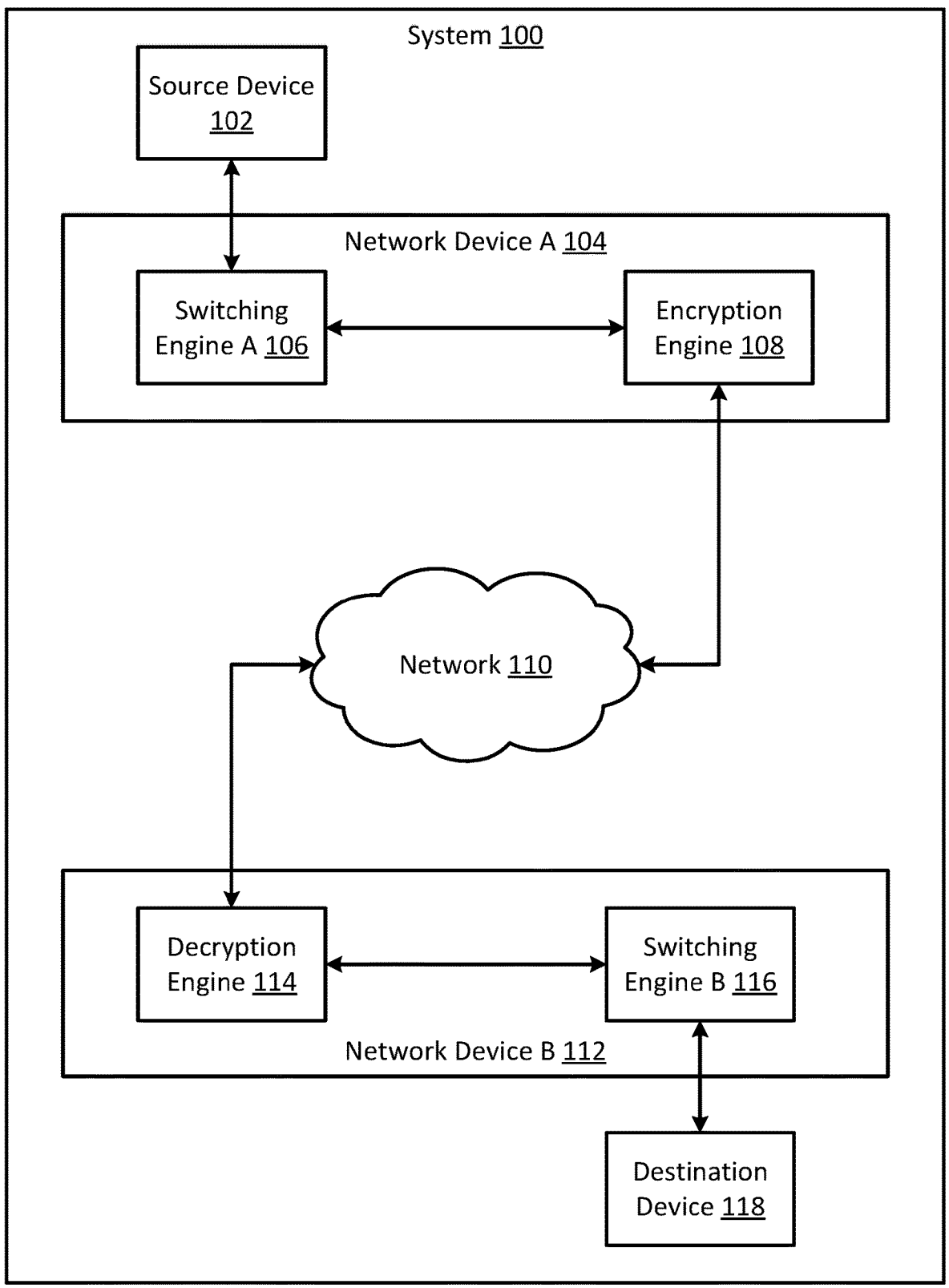
FIG. 1 shows a system in accordance with one or more embodiments.

Specific embodiments will now be described with reference to the accompanying figures. In the following description, numerous details are set forth as examples of one or more embodiments. It will be understood by those skilled in the art, and having the benefit of this Detailed Description, that one or more embodiments may be practiced without these specific details and that numerous variations or modifications may be possible without departing from the scope of the embodiments disclosed herein. Certain details known to those of ordinary skill in the art may be omitted to avoid obscuring the description.

In the following description of the figures, any component described with regard to a figure, in various embodiments disclosed herein, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments disclosed herein, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments relate to methods and systems for modifying (e.g., encrypting and decrypting) network traffic that is transmitted via a network using certain protocols (e.g., Internet Protocol (IP)). Specifically, in one or more embodiments, network traffic that is to traverse a public network via a network tunnel, and is navigating using IP, utilizes a specialized hardware configuration to encrypt and decrypt network traffic such that speed and efficiency of the network traffic may be improved relative to systems that lack such a specialized hardware configuration.

In one or more embodiments, a determination is made that network traffic is intended to traverse a network tunnel and is therefore tagged and encrypted before entering the tunnel. Subsequently, in one or more embodiments, once the encrypted network traffic arrives at a decryption engine at the end of the tunnel, the network traffic is decrypted before being transmitted towards the network traffic's destination.

FIG. 1 shows a system (100) in accordance with one or more embodiments.

In one or more embodiments, the system (100) includes a source device (102), network device A (104) (which includes switching engine A (106) and encryption engine (108)), network (110), network device B (112) (which includes decryption engine (114) and switching engine B (116)), and destination device (118). Each of these devices is described below.

In one or more embodiments, a network device (e.g., network device A (104) and network device B (112)) is a physical device that includes and/or is operatively connected to persistent storage (not shown), memory (e.g., random access memory (RAM)) (not shown), one or more processor (s) (e.g., integrated circuits) (not shown), and at least one physical network port (not shown), which may also be referred to as an interface. Examples of a network device include, but are not limited to, a network switch, a router, a multilayer switch, a fibre channel device, an InfiniBand® device, etc. A network device is not limited to the aforementioned specific examples.

In one or more embodiments, a network device (e.g., 104, 112) includes functionality to receive network traffic data units (e.g., frames, packets, tunneling protocol frames, etc.) at any of the physical network ports (i.e., interfaces) of the network device, and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., transmission from a certain egress port, adding a labeling protocol header, rewriting a destination address, encapsulation, etc.). Such a series of lookups and corresponding actions may include how to route/transmit the network traffic data unit in order to transmit the network traffic data unit from an interface of the network device. One or more actions to be taken with regards to a received network traffic data unit may be obtained by a network device based on the network traffic data unit being recognized as located within a particular category, which may have one or more associated actions and/or items of information relevant to processing the network traffic data unit (e.g., label switched path protocol actions, multipath information, egress interface information, etc.).

In one or more embodiments, a network device also includes and/or is operatively connected to device storage and/or device memory (i.e., non-transitory computer readable mediums) storing software and/or firmware. Such software and/or firmware may include instructions which, when executed by the one or more processors (not shown) of a network device, cause the one or more processors to perform operations in accordance with one or more embodiments described herein.

In one or more embodiments, a network device (104, 112) may be capable of receiving and transmitting network data based on specialized routing techniques. For example, in one or more embodiments, a network device (104, 112) is capable of performing a forwarding action based on information obtained from the network traffic data unit. Continuing the example, a network device may be able to receive and analyze a network traffic data unit to identify the existence of forwarding information. Further, in one or more embodiments, if forwarding information is present, the forwarding information may indicate the destination of the network traffic data unit and/or a special routing technique (e.g., a particular network device, or set of network devices (i.e., a network path), through which the network traffic data unit is intended to traverse). Thus, if such forwarding information exists, the network device may be able to transmit that network traffic data unit to the next appropriate network device (e.g., a 'next-hop' network device) without having to perform any traditional form of lookups or forwarding (e.g., using a destination IP address to identify an egress port). Further, in one or more embodiments, prior to forwarding the network traffic data unit to the next device, the network device removes a segment of the forwarding information, as that segment is no longer needed, because the next device in the route has been identified.

In one or more embodiments, a network device may be able to identify the destination of a network traffic data unit, perform a lookup, and identify, based on the destination, that the network traffic data unit is intended to traverse the network in a particular path. Accordingly, in one or more embodiments, the network device transmits the network traffic data unit to the next appropriate network device as specified by the lookup. In one or more embodiments, a network device may be capable of utilizing multiprotocol label switching (MPLS), shortest path bridging (SPB), equal-cost multipath routing (ECMP), generalized multiprotocol label switching (GMPLS), and/or any other routing techniques for the forwarding of network traffic data units.

In one or more embodiments, a source device (e.g., source device (102)) is a device that includes functionality to operatively communicate with a destination device (e.g., destination device (118)). More specifically, the source device (e.g., source device (102)) may include functionality to generate and/or transmit network traffic data units addressed to the destination device (e.g., destination device (118)). In one or more embodiments, a source device (e.g., source device (102)) is capable of generating a network traffic data unit that includes (i) a payload and/or (ii) forwarding information.

In one or more embodiments, a source device (102) is a network device (described above). In other embodiments, a source device (e.g., source device (102)) is a computing device that generates a network traffic data unit and transmits that network traffic data unit to a network device (e.g., network device (104)). In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a virtual machine executing using underlying device hardware, and/or any other type of computing device with the aforementioned requirements.

In one or more embodiments, a switching engine (e.g., switching engine A (106), switching engine B (116)) is any hardware (e.g., circuitry), or a combination of hardware and software, capable of receiving data, processing the data, and transmitting the data. In one or more embodiments, a switching engine (e.g., switching engine A (106) and switching engine B (116)) is a component of a network device (e.g., network device A (104), network device B (112)) that performs some or all of the functionalities of the network device (e.g., network device A (104), network device B (112)). For example, in one or more embodiments, a switching engine (e.g., switching engine A (106), switching engine B (116)) is capable of (i) receiving a network traffic data unit, (ii) analyzing the network traffic data unit to determine a destination (e.g., via a lookup), (iii) determining a network tunnel through which the network traffic data unit is intended to traverse, and/or (iv) appending information to the network traffic data unit that indicates the tunnel to be traversed and what encryption type is intended to be used.

As another example, in one or more embodiments, a switching engine (e.g., switching engine A (106), switching engine B (116)) is capable of receiving a decrypted network traffic data unit, already appended with post-decryption information, and is configured to (i) analyze that post-decryption information to (ii) determine whether the decrypted network traffic data unit was successfully decrypted, and (iii) transmit the decrypted network traffic data unit if the post-decryption information does not indicate any error; or alternatively, a switching engine (e.g., switching engine A (106) and switching engine B (116)) is configured to perform an error action if the post-decryption information indicates that the decryption of an encrypted network traffic data unit was not fully successful.

In one or more embodiments, an encryption engine (e.g., encryption engine (108)) is any hardware (e.g., circuitry), or a combination of hardware and software, capable of receiving data, processing the data to obtain modified data, and transmitting the data. Further, in one or more embodiments, an encryption engine (e.g., encryption engine (108)) may be all or any portion of a network device (e.g., network device (104)). The modification performed by an encryption engine (e.g., encryption engine (108)) may be of any type that transforms the data from one form to another (e.g., encryption, appending of headers and/or tails, addition and/or removal of tags and/or identifiers, authentication, verification, etc.). Further, in one or more embodiments, the modification and/or encryption performed by the encryption engine (e.g., encryption engine (108)) may be similar to, or some variation of, Medium Access Control type Security (MACsec) type as standardized by the Institute of Electrical and Electronics Engineers (IEEE) in IEEE 802.1AE, and/or IP Security (IPsec) Encapsulating Security Payload (ESP) as described in the Internet Engineering Task Force (IETF) Request for Comments (RFC) 4303 and IETF RFC 3948. In one or more embodiments, the encryption performed by the encryption engine (e.g., encryption engine (108)) uses an Advanced Encryption Standard Galois/Counter Mode (AES-GCM) cipher suite. One of ordinary skill in the art, having the benefit of this Detailed Description, will appreciate that an encryption engine may also be capable of performing all of the functions of a decryption engine (described below).

In one or more embodiments, an encryption engine (e.g., encryption engine (108)) may modify only a portion of the network traffic data unit that the encryption engine (e.g., encryption engine (108)) is provided (e.g., modifying only a payload, but not forwarding information). Alternatively, in one or more embodiments, an encryption engine (e.g., encryption engine (108)) may modify at least a portion of both the payload and accompanying forwarding information (e.g., modifying a payload and at least one tunneling header and/or identifier). Additionally, in one or more embodiments, an encryption engine (e.g., encryption engine (108)) may be capable of transmitting or causing the transmission of the data to another device or component after modification. In one or more embodiments, the encryption engine (e.g., encryption engine (108)) is operatively connected to a network (e.g., network (110)).

In one or more embodiments, a network (e.g., network (110)) is a collection of connected network devices that allow for the communication of data from one network device to other network devices, or the sharing of resources among network devices. Examples of a network (e.g., network (110)) include, but are not limited to, a local area network (LAN), a wide area network (WAN) (e.g., the Internet), a mobile network, or any other type of network that allows for the communication of data and sharing of resources among network devices and/or devices (e.g., computing devices) operatively connected to the network (e.g., network (110)). In one or more embodiments, the source device (e.g., source device (102)) is operatively connected to a network (e.g., network (110)) via a network device (e.g., network device A (104)).

In one or more embodiments, a decryption engine (e.g., decryption engine (114)) is any hardware (e.g., circuitry), or a combination of hardware and software, capable of receiving data, processing the data to obtain modified data, and transmitting the data. Further, in one or more embodiments, a decryption engine (e.g., decryption engine (114)) may be all or any portion of a network device (e.g., network device (112)). The modification performed by a decryption engine (e.g., decryption engine (114)) may be of any type that transforms the data from one form to another (e.g., decryption, appending of headers and/or tails, addition and/or removal of tags and/or identifiers, authentication, verification, etc.). Further, in one or more embodiments, the modification and/or decryption performed by the decryption engine (e.g., decryption engine (114)) may be similar to, or some variation of, MACsec as standardized in IEEE 802.1AE, and/or IPsec ESP as described in the IETF RFC 4303 and IETF RFC 3948. In one or more embodiments, the modification and/or decryption performed by the decryption engine (e.g., decryption engine (114)) may use an AES-GCM cipher suite. One of ordinary skill in the art, having the benefit of this Detailed Description, will appreciate that a decryption engine may also be capable of performing all of the functions of an encryption engine (described above).

In one or more embodiments, a decryption engine (e.g., decryption engine (114)) may modify only a portion of the network traffic data unit that the decryption engine (e.g., decryption engine (114)) is provided (e.g., modifying only a payload, but not forwarding information). Alternatively, in one or more embodiments, a decryption engine (e.g., decryption engine (114)) may modify at least a portion of both the payload and accompanying forwarding information (e.g., modifying a payload and at least a portion of the tunneling headers or identifiers). Additionally, in one or more embodiments, a decryption engine (e.g., decryption engine (114)) may be capable of transmitting or causing the transmission of the data to another device or component after modification. In one or more embodiments, the decryption engine (e.g., decryption engine (114)) is operatively connected to a network (e.g., network (110)).

In one or more embodiments, a decryption engine (e.g., decryption engine (114)) is capable of (i) making a determination that an encrypted network traffic data unit specifies a network tunnel terminating at a network device (e.g., network device A (104), network device B (112)) that includes the decryption engine (e.g., decryption engine (114)) (ii) analyzing the encrypted network traffic data unit to determine the encryption type used to encrypt the data therein, (iii) authenticating and decrypting the encrypted portion, (iv) removing forwarding information, and (v) appending other post-decryption information.

While FIG. 1 shows a specific configuration of system (100), other configurations may be used without departing from the scope of the disclosure. For example, although the source device (102) and network device A (104) are shown to be directly connected, there may be one or more other devices (e.g., network devices) between the source device and the network device that operatively connect the source device (102) and network device A (104). Similarly, although the destination device (118) and network device B (112) are shown to be directly connected, there may be one or more other devices (e.g., network devices) between the destination device and the network device that operatively connect the destination device (118) and network device B (112). Additionally, although the source device (102) and network device A (104) are shown to be two separate devices, network device A (104) may be the source device that generates the network traffic data unit. Similarly, although destination device (118) and network device B (112) are shown to be two separate devices, network device B (112) may be the destination device that requests the network traffic data unit from the source device (102). Accordingly, embodiments disclosed herein should not be limited to the configuration of devices and/or components shown in FIG. 1.

Figure 2A:
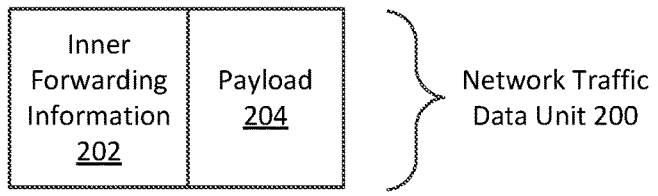
FIG. 2A shows a system in accordance with one or more embodiments.

FIG. 2A shows a network traffic data unit (200) in accordance with one or more embodiments. In one or more embodiments, FIG. 2A depicts the network traffic data unit (200) as received at a switching engine after transmission from a source device. In one or more embodiments, the network traffic data unit (200) includes inner forwarding information (202) and a payload (204). Each of these components is described below.

In one or more embodiments, forwarding information is data appended to a network traffic data unit. In one or more embodiments, forwarding information indicates a single destination for the network traffic data unit (e.g., via an IP routing scheme). In another embodiment, forwarding information may specify one or more network devices through which the network traffic data unit is intended to traverse (e.g., via an MPLS routing scheme). Further, in one or more embodiments, forwarding information may include a combination of routing techniques (e.g., MPLS header(s) and an IP header) that specifies both (i) a particular path the network traffic data unit is intended to traverse to arrive at a network device (e.g., an MPLS network tunnel) before (ii) being routed in an undetermined path (e.g., IP routing). One of ordinary skill in the art, having the benefit of this Detailed Description, would appreciate that any form of routing technique may be specified alone, or in combination with other routing technique(s) in any order. Examples of routing techniques include, but are not limited to, MPLS, GMPLS, SPB, and ECMP.

In one or more embodiments, inner forwarding information (e.g., inner forwarding information (202)) is a form of forwarding information (i.e., data) appended to a network traffic data unit that indicates to a network device to utilize a specific routing technique when processing the network traffic data unit (e.g., network traffic data unit (200)). One of ordinary skill in the art, having the benefit of this Detailed Description, would appreciate that the forwarding information may take many forms including, but not limited to, headers, trailers, and/or identifiers. In one or more embodiments, the inner forwarding information (202) also specifies the destination (e.g., the destination device) of the network traffic data unit (200) (e.g., via a destination IP address and/or destination MAC address). In one or more embodiments, the inner forwarding information (202) additionally specifies a unique identifier of the next network device through which the network traffic data unit (200) is intended to traverse (e.g., a network device MAC address).

In one or more embodiments, a payload (e.g., payload (204)) includes the data that is intended to reach the destination device. For example, the payload (204) may include user data requested by the destination device and stored by the source device. Thus, in one or more embodiments, the source device generates the network traffic data unit (200) with appropriate forwarding information so as to facilitate delivery of the payload to the destination device.

In one or more embodiments, in addition to the user data, the payload may include forwarding information. That is, for example, the payload may include Ethernet headers, IP headers, user data, a separate encryption scheme, specifications for routing via a specialized technique, and/or any other form of data. One of ordinary skill in the art, having the benefit of this Detailed Description, would appreciate that the payload may, itself, include all of the contents of a network traffic data unit.

While FIG. 2A shows a specific configuration of a network traffic data unit (200), other configurations may be used without departing from the scope of the disclosure. For example, although the network traffic data unit (200) is shown with only inner forwarding information (202) and a payload (204), the network traffic data unit (200) may also include other data and/or metadata including, but not limited to, a preamble, time to live (TTL) data, a start frame delimiter (SFD), other headers, a frame check sequence (FCS), other trailers, and/or flags. Accordingly, embodiments disclosed herein should not be limited to the configuration of portions of a network traffic data unit shown in FIG. 2A.

Figure 2B:
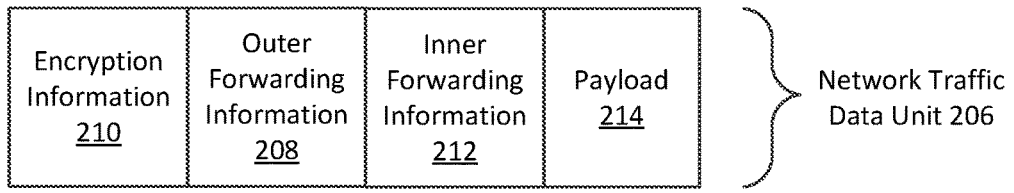
FIG. 2B shows a system in accordance with one or more embodiments.

FIG. 2B shows a network traffic data unit (206) in accordance with one or more embodiments. In one or more embodiments, FIG. 2B depicts the network traffic data unit (206) as received at an encryption engine after transmission from a switching engine. In one or more embodiments, the network traffic data unit (206) includes encryption information (210), outer forwarding information (208), inner forwarding information (212), and a payload (214). Each of these components is described below.

In one or more embodiments, the outer forwarding information (208) is another form of forwarding information, as described above in the description of FIG. 2A. In one or more embodiments, outer forwarding information (208) is separated from the payload (214) and inner forwarding information (212), which is appended nearer to the payload (214) than the outer forwarding information (208). Hence, in one or more embodiments, the adjectives "inner" and "outer" are used herein to describe proximity to the payload (214).

In one or more embodiments, outer forwarding information (e.g., outer forwarding information (208)) may allow for "IP in IP" encapsulation as the inner forwarding information (e.g., inner forwarding information (212)) is fully encapsulated in addition to the payload (e.g., payload (214)). Thus, in one or more embodiments, the inner forwarding information (e.g., inner forwarding information (212)) may be encrypted (in addition to the payload) and still allow for the transmission of the network traffic data unit (e.g., network traffic data unit (206)) using the outer forwarding information (e.g., outer forwarding information (208)).

In one or more embodiments, encryption information (210) indicates the encryption type to be used by the encryption engine. For example, the encryption information (210) may specify AES-GCM type security is to be used to encrypt the inner forwarding information (212) and/or payload (214). In one or more embodiments, the encryption information (210) may be referred to as a Security Association (SA) tag. In one or more embodiments, encryption information (210) may specify one or more SAs (e.g., MACsec Secure Channel Identifier (SCI), encryption key, etc.) to use when encrypting some or all of a network traffic data unit. In one or more embodiments, encryption information (210) may specify one or more encryption parameters (e.g., cipher-suite, encryption keys, etc.). In one or more embodiments, the encryption information (e.g., encryption information (210)) indicates to a network device that the network traffic data unit (206) is to be encrypted without specifying the encryption type; and in such an instance, the encryption engine may perform a pre-determined type of encryption based on the encryption information (e.g., encryption information (210)) lacking an indication of the type of encryption. One of ordinary skill in the art, having the benefit of this Detailed Description, would appreciate that any type of suitable encryption may be used to encrypt the inner forwarding information (212) and payload (214).

In one or more embodiments, inner forwarding information (e.g., inner forwarding information (212)) is similar to inner forwarding information as described above in the description of FIG. 2A. In one or more embodiments, payload (e.g., payload (214)) is similar to the payload as described above in the description of FIG. 2A.

While FIG. 2B shows a specific configuration of a network traffic data unit (206), other configurations may be used without departing from the scope of the disclosure. For example, although the network traffic data unit (206) is shown with only outer forwarding information (208), encryption information (210), inner forwarding information (212), and a payload (214), the network traffic data unit (206) may also include other data and/or metadata including, but not limited to, a preamble, TTL data, a SFD, other headers, a FCS, other trailers, and/or flags. Accordingly, embodiments disclosed herein should not be limited to the configuration of portions of a network traffic data unit as shown in FIG. 2B.

Figure 2C:
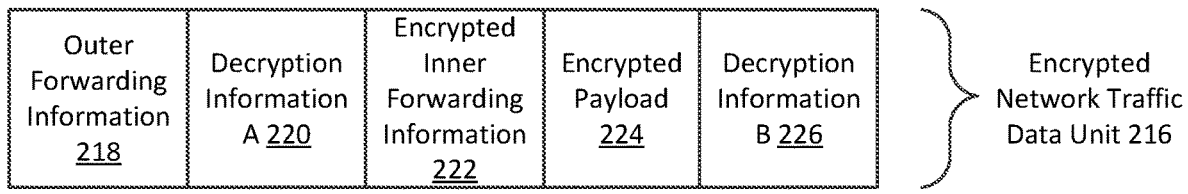
FIG. 2C shows a system in accordance with one or more embodiments.

FIG. 2C shows an encrypted network traffic data unit (216) in accordance with one or more embodiments. In one or more embodiments, FIG. 2C depicts the encrypted network traffic data unit (216) as received at a decryption engine after transmission from an encryption engine (e.g., via a network). In one or more embodiments, the encrypted network traffic data unit (216) includes outer forwarding information (218), decryption information A (220), encrypted inner forwarding information (222), an encrypted payload (224), and decryption information B (226). Each of these components is described below.

In one or more embodiments, decryption information (e.g., decryption information A (220), decryption information B (226)) is appended to an encrypted network traffic data unit (e.g., encrypted network traffic data unit (216)) during, or immediately after, the encryption of the network traffic data unit by an encryption engine. In one or more embodiments, the decryption information (e.g., decryption information A (220), decryption information B (226)) specifies information necessary for a decryption engine to be able to decrypt the encrypted data of the encrypted network traffic data unit (216). In one or more embodiments, the decryption information (e.g., decryption information A (220), decryption information B (226)) may provide and/or specify (i) the encryption type used (e.g., MACsec, IPsec ESP), (ii) replay protection, (iii) and/or an integrity check value (ICV) for the encrypted network traffic data unit (216).

In one or more embodiments, decryption information A (220) specifies (i) the encryption type used and (ii) the replay protection, whereas decryption information B (226) specifies (iii) the ICV. One of ordinary skill in the art, having the benefit of this Detailed Description, would appreciate that any of (i) the encryption type used, (ii) replay protection, (iii) and/or the ICV may be specified and/or provided by both decryption information A (220) and/or decryption information B (226), or some variation thereof.

In one or more embodiments, encrypted inner forwarding information (e.g., encrypted inner forwarding information (222)) is similar to inner forwarding information as described above in the description of FIG. 2A except that the inner forwarding information was modified by the encryption engine. In one or more embodiments, the encrypted inner forwarding information (222) is modified so that the content of the encrypted inner forwarding information (222) is obscured and rendered unreadable without first being decrypted. Accordingly, devices (e.g., network devices in a network path between an encryption engine and a decryption engine) are unable to read and/or modify whatever data is included in the encrypted inner forwarding information (222).

In one or more embodiments, an encrypted payload (e.g., encrypted payload (224)) is similar to the payload as described above in the description of FIG. 2A except that the payload was modified by the encryption engine. In one or more embodiments, the encrypted payload (224) is modified so that the content of the encrypted payload (224) is obscured and rendered unreadable without first being decrypted. Accordingly, devices (e.g., network devices in a network path between an encryption engine and a decryption engine) are unable to read and/or modify whatever data is included in the encrypted payload (224).

In one or more embodiments, outer forwarding information (218) is similar to the outer forwarding information (208) as described above in the description of FIG. 2B.

While FIG. 2C shows a specific configuration of an encrypted network traffic data unit (216), other configurations may be used without departing from the scope of the disclosure. For example, although the encrypted network traffic data unit (216) is shown with only outer forwarding information (218), decryption information A (220), encrypted inner forwarding information (222), an encrypted payload (224), and decryption information B (226), the encrypted network traffic data unit (216) may also include other data and/or metadata including, but not limited to, a preamble, TTL data, a SFD, other headers, a FCS, other trailers, and/or flags. Accordingly, embodiments disclosed herein should not be limited to the configuration of portions of a network traffic data unit as shown in FIG. 2C.

Figure 2D:
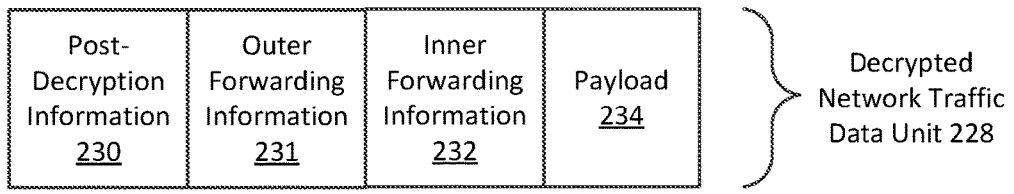
FIG. 2D shows a system in accordance with one or more embodiments.

FIG. 2D shows a decrypted network traffic data unit (228) in accordance with one or more embodiments. In one or more embodiments, FIG. 2D depicts the encrypted network traffic data unit (216) as received at a switching engine after transmission from a decryption engine. In one or more embodiments, the decrypted network traffic data unit (228) includes post-decryption information (230), outer forwarding information (231), inner forwarding information (232), and a payload (234). Each of these components is described below.

In one or more embodiments, post-decryption information (e.g., post-decryption information (230)) is data that is appended to a decrypted network traffic data unit (e.g., decrypted network traffic data unit (228)) after the decryption has occurred. In one or more embodiments, post-decryption information (e.g., post-decryption information (230)) may specify (i) a decryption status (e.g., an indication that the decrypted network traffic data unit was previously encrypted), (ii) the encryption type that was used, (iii) whether the decryption was successful (e.g., an error indicator, or absence thereof), and/or (iv) other information about the status of the decrypted network traffic data unit.

In one or more embodiments, inner forwarding information (e.g., inner forwarding information (232)) is similar to inner forwarding information as described above in the description of FIG. 2A. In one or more embodiments, payload (e.g., payload (234)) is similar to the payload as described above in the description of FIG. 2A.

In one or more embodiments, outer forwarding information (231) is similar to the outer forwarding information (208) as described above in the description of FIG. 2B.

While FIG. 2D shows a specific configuration of a decrypted network traffic data unit (228), other configurations may be used without departing from the scope of the disclosure. For example, although the decrypted network traffic data unit (228) is shown with only post-decryption information (230), outer forwarding information (231), inner forwarding information (232), and a payload (234), the decrypted network traffic data unit (228) may also include other data and/or metadata including, but not limited to, a preamble, TTL data, a SFD, other headers, a FCS, other trailers, and/or flags. Accordingly, embodiments disclosed herein should not be limited to the configuration of portions of a network traffic data unit as shown in FIG. 2D.

Figure 2E:
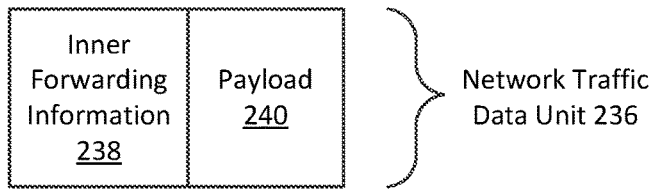
FIG. 2E shows a system in accordance with one or more embodiments.

FIG. 2E shows a network traffic data unit (236) in accordance with one or more embodiments. In one or more embodiments, FIG. 2E depicts the network traffic data unit (236) as received at a destination device after transmission from a switching engine. In one or more embodiments, the network traffic data unit (236) includes inner forwarding information (238) and a payload (240). Each of these components is described below.

In one or more embodiments, inner forwarding information (e.g., inner forwarding information (238)) is similar to inner forwarding information as described above in the description of FIG. 2A. In one or more embodiments, payload (e.g., payload (240)) is similar to the payload as described above in the description of FIG. 2A.

In one or more embodiments, the network traffic data unit of FIG. 2E is substantially similar to the network traffic data unit of FIG. 2A. For example, with the exception of variations to the inner forwarding information (e.g., MAC address of next-hop network device), after the network traffic data unit is tagged, encrypted, transmitted through a network tunnel, decrypted, and untagged, the network traffic data unit appears in substantially the same form with substantially the same data as when first generated by the source device. Accordingly, in one or more embodiments, all of the information appended to the network traffic data unit to process and transmit the network traffic data unit is removed prior to arriving at the destination device. Further, in one or more embodiments, all of the processing (e.g., encryption) is reversed or otherwise undone prior to arriving at the destination device.

While FIG. 2E shows a specific configuration of a network traffic data unit (236), other configurations may be used without departing from the scope of the disclosure. For example, although the network traffic data unit (236) is shown with only inner forwarding information (238) and a payload (240), the network traffic data unit (236) may also include other data and/or metadata including, but not limited to, a preamble, TTL data, a SFD, other headers, a FCS, other trailers, and/or flags. Accordingly, embodiments disclosed herein should not be limited to the configuration of portions of a network traffic data unit as shown in FIG. 2E.

Figure 3:
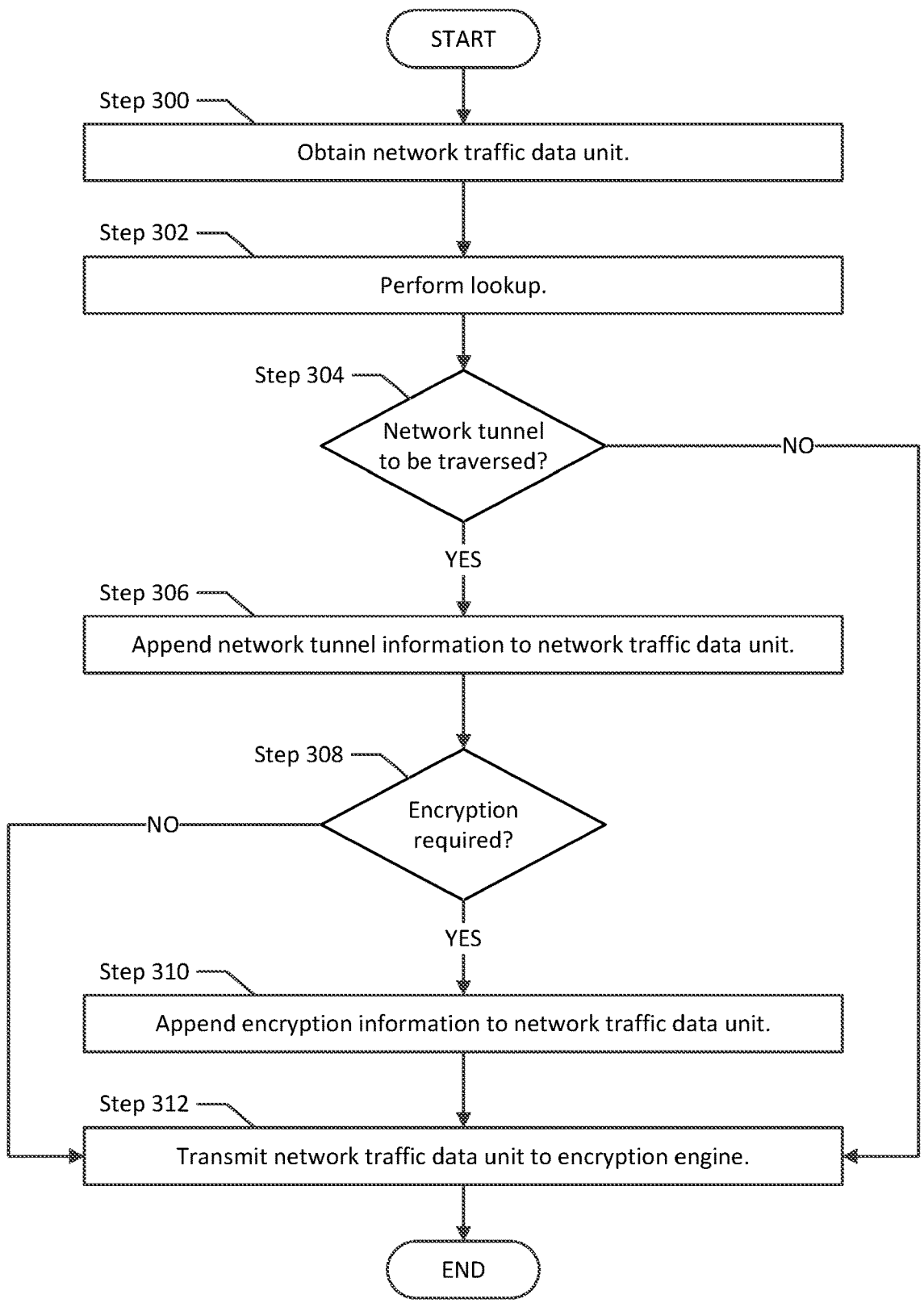
FIG. 3 shows a flowchart in accordance with one or more embodiments.

FIG. 3 shows a flowchart describing the operations performed by a switching engine on a network traffic data unit prior to encryption according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 300, a network traffic data unit is obtained by a switching engine that includes, at least, (i) forwarding information and (ii) a payload. In one or more embodiments, the switching engine may have received the network traffic data unit directly from a source device, or from another intermediary network device operatively connected to the source device. Alternatively, in one or more embodiments, the switching engine may also be the source device that generates the network traffic data unit.

In one or more embodiments, the network device that includes the switching engine is located inside of a private (e.g., not public) network (e.g., site). Accordingly, in one or more embodiments, there is a presumption that the site that includes the network device is sufficiently secure enough to allow for the network traffic data unit to be transmitted in-the-clear (e.g., unencrypted, decrypted, not encrypted), at least until reaching the switching engine.

In Step 302, the switching engine performs a lookup using at least a portion of the network traffic data unit to determine a network tunnel through which the network traffic data unit is to be transmitted. In one or more embodiments, the lookup uses the forwarding information included in the network traffic data unit to determine a path or next network device through which the network traffic data unit is intended to traverse.

In Step 304, a determination is made as to whether the network traffic data unit is intended to traverse a network tunnel. In one or more embodiments, the determination as to whether the network traffic data unit is intended to traverse a network tunnel is performed by analyzing the inner forwarding information appended to the network traffic data unit to identify a specified network tunnel. If the determination is made that the network traffic data unit is not to traverse a network tunnel, the process proceeds to Step 312. However, if the determination is made that the network traffic data unit is intended to traverse a network tunnel, the process proceeds to Step 306.

In Step 306, in one or more embodiments, after the network tunnel is identified, the egress port associated with the network tunnel is determined. In one or more embodiments, the switching engine is configured to identify the egress port by association with the identified network tunnel and/or by performing a lookup to identify an egress port configured to interact with the network tunnel.

In one or more embodiments, the switching engine appends network tunnel information to the network traffic data unit relating to the network tunnel through which the network traffic data unit is intended to traverse. In one or more embodiments, the network tunnel information indicates (i) the port through which the network traffic data unit is intended to be transmitted out of the network device, (ii) the encryption engine to transmit the network traffic data unit towards, and/or (iii) outer forwarding information that specifies the path through the network tunnel and/or a destination device that terminates the network tunnel.

For example, in one or more embodiments, the network tunnel information may specify a port of the network device that includes an encryption engine that is operatively connected to the destination device. Further, in one or more embodiments, the network tunnel information includes the outer forwarding information that specifies a path to traverse over a network. Thus, in one or more embodiments, the appended network tunnel information allows the network traffic data unit to traverse one or more networks to arrive at the network device that terminates the network tunnel.

In Step 308, a determination is made about whether the network traffic data unit needs to be encrypted. If the determination is made that the network traffic data unit is not to be encrypted, the process proceeds to Step 312. Alternatively, if the determination is made that the network traffic data unit is to be encrypted, the process proceeds to Step 310.

In one or more embodiments, the determination as to whether the network traffic data unit needs to be encrypted is based on the destination device, the network tunnel through which the network traffic data unit is assigned to traverse, the port through which the network traffic data unit is assigned to exit the network device, and/or on any other data or metadata associated with the network traffic data unit.

For example, in one or more embodiments, the switching engine is configured to determine that, based on the network tunnel information, all network traffic traversing the associated network tunnel needs to be encrypted. Accordingly, in one or more embodiments, the switching engine makes a determination that the network traffic data unit needs to be encrypted.

In Step 310, encryption information is appended to the network traffic data unit. In one or more embodiments, as described above in the description of FIG. 2B, the encryption information indicates the encryption type to be used by the encryption engine. For example, the encryption information may specify IPsec ESP and/or MACsec type security is to be used to encrypt the inner forwarding information and/or payload. In one or more embodiments, the encryption information merely indicates to a network device that the network traffic data unit is to be encrypted without specifying the encryption type. In one or more embodiments, the encryption information may be referred to as a SA tag. One of ordinary skill in the art, having the benefit of this Detailed Description, would appreciate that any type of suitable encryption may be used to encrypt the inner forwarding information and/or the payload.

In Step 312, the network traffic data unit is transmitted towards the encryption engine. In one or more embodiments, depending on the various determinations made prior to transmission to the encryption engine (e.g., determinations made in Step 304 and/or Step 308), the network traffic data unit may be appended with network tunnel information (as appended in Step 306) and with encryption information (as appended in Step 310). In one or more embodiments, regardless of the whether network tunnel information or encryption information is appended to the network traffic data unit, the network traffic data unit is transmitted towards the encryption engine.

Figure 4:
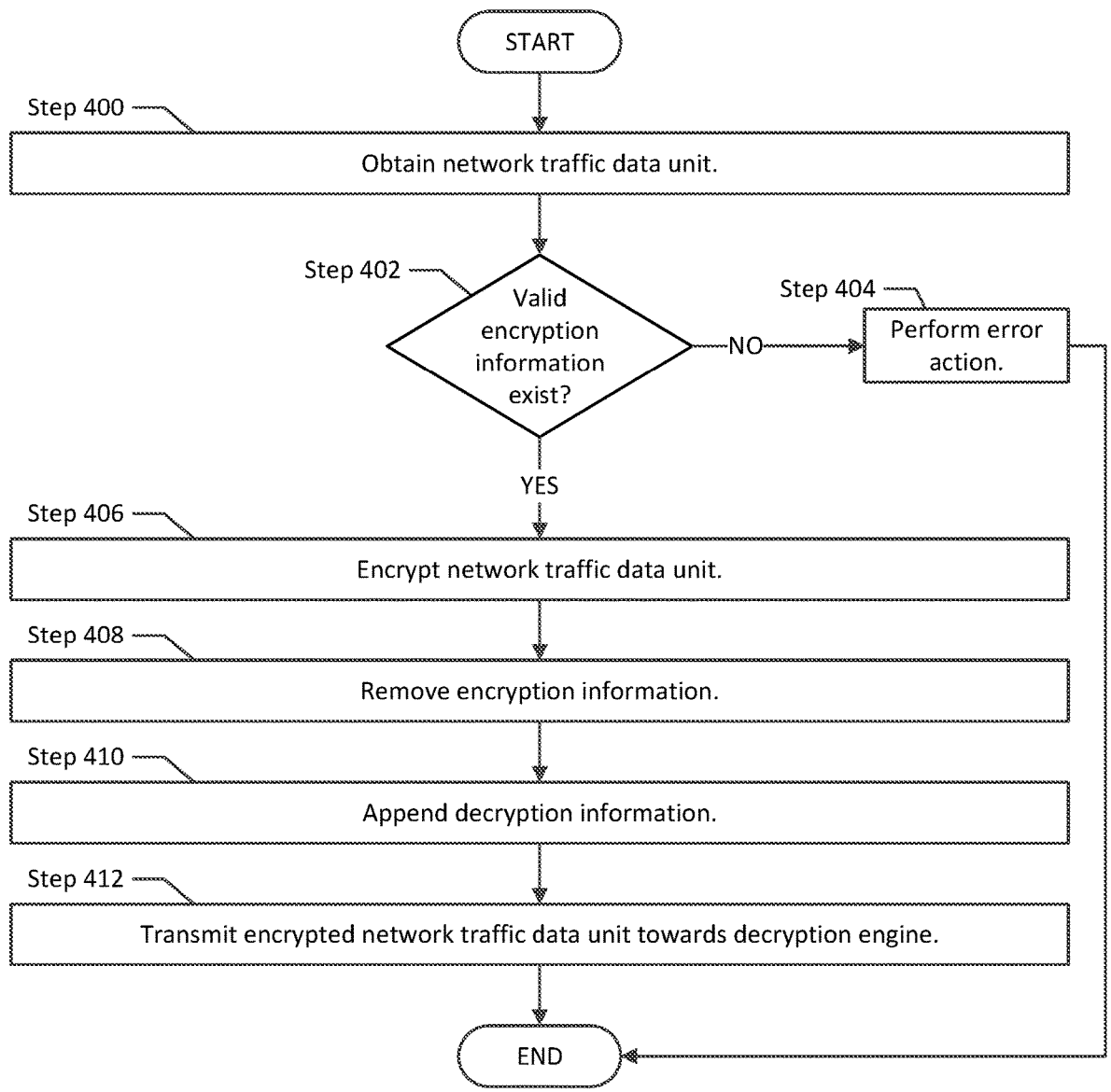
FIG. 4 shows a flowchart in accordance with one or more embodiments.

FIG. 4 shows a flowchart describing the operations performed by an encryption engine on a network traffic data unit for encryption according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 400, an encryption engine obtains a network traffic data unit. Depending on the various determinations made by the switching engine (e.g., determinations made in Step 304 and/or Step 308 in FIG. 3), the network traffic data unit may or may not be appended with network tunnel information or encryption information.

In Step 402, a determination is made as to whether valid encryption information is appended to the network traffic data unit. If the network traffic data unit lacks any encryption information, or errors exist within the encryption information, the process proceeds to Step 404. However, if the network traffic data unit is appended with valid encryption information, the process proceeds to Step 406.

In one or more embodiments, encryption information may be invalid or include an error if the encryption specified in the encryption information cannot be performed by the encryption engine and/or the encryption information fails to specify which portion of the network traffic data unit is to be encrypted (and the encryption engine is not configured to make such a determination).

In Step 404, in one or more embodiments, although not shown in FIG. 4, if the network traffic data unit lacks any encryption information or an error exists within the encryption information (as determined in Step 402), the encryption engine may perform an error action that includes (i) dropping the network traffic data unit, (ii) quarantining the network traffic data unit, (iii) alerting a system administrator, (iv) transmitting the network traffic data unit to a system for further analysis/processing, (v) logging the error in an appropriate log of the network device; and/or (vi) any other appropriate action for processing an erroneous decrypted network traffic data unit. Alternatively, in one or more embodiments, if the network traffic data unit lacks any encryption information or an error exists within the encryption information (as determined in Step 402), the encryption engine may transmit the network traffic data unit through an egress port of the network device without any modification.

In one or more embodiments, if the network traffic data unit does not have any network tunnel information (See FIG.

3, Step 304—NO), the network traffic data unit may not have encryption information. In one or more embodiments, if the network traffic data unit is not intended to traverse a network tunnel, but is merely intended to traverse one or more networks unencrypted using the inner forwarding information, the encryption engine will not perform any modification, but rather pass the network traffic data unit through towards the network traffic's destination.

In Step 406, after the determination is made that the network traffic data unit is appended with valid encryption information, a portion of the network traffic data unit is encrypted. In one or more embodiments, the encryption engine performs the encryption type specified by the encryption information and encrypts the portion of the network traffic data unit specified by the encryption information. In one or more embodiments, the portion of the network traffic data unit to be encrypted includes only the payload and the inner forwarding information but not the outer forwarding information. Alternatively, in one or more other embodiments, the portion of the network traffic data unit to be encrypted includes only the payload (and all forwarding information remains unencrypted).

In one or more embodiments, encrypting a portion of the network traffic data unit involves modifying the content of the encrypted portion to obscure and render the encrypted portion as unreadable without first being decrypted. For example, the encrypted portion of the network traffic data unit may be encrypted such that only those devices with the necessary information to decrypt the content are able to read that content. Accordingly, network devices lacking the necessary information to decrypt the encrypted portion are unable to read the data included in the encrypted portion of the network traffic data unit.

In one or more embodiments, the encryption engine generates data unique to network traffic data unit using the network traffic data unit (e.g., a hash, sequence number). Thus, in one or more embodiments, the encryption engine generates data that can be appended to the encrypted network traffic data unit to ensure to any recipient that the content of the encrypted portion was not altered. Further, in one or more embodiments, the encryption engine may generate other data that prevents (or makes more difficult) an attempt to maliciously or fraudulently repeat and/or delay the content and/or transmission of the encrypted network traffic data unit (e.g., a replay attack).

In one or more embodiments, the encryption engine may generally secure the network traffic data unit (or some portion thereof). As used herein, securing a network traffic data unit (or some portion thereof) may include one or more of the processes described above, including (i) encrypting (rendering data unreadable without first being decrypted), (ii) generating a hash and/or sequence number (to make malicious repeating more difficult), (iii) appending decryption information (described below in the description of step 410), and/or (iv) appending and/or modifying any other information that would prevent, or make more difficult, the malicious and/or fraudulent interception, reading, processing, modification, and/or recreation of data of the encrypted network traffic data unit.

In Step 408, the encryption information is removed from the network traffic data unit. In one or more embodiments, as the encrypted portion of the network traffic data unit has been encrypted, the encryption information is removed such that while the encrypted network traffic data unit is traversing a public network, the encryption information cannot be intercepted.

In Step 410, decryption information is appended to the network traffic data unit. In one or more embodiments, as described above in the description of FIG. 2C, decryption information is appended to an encrypted network traffic data unit during, or immediately after, the encrypted portion of the network traffic data unit is encrypted by an encryption engine. In one or more embodiments, the decryption information specifies information necessary for a decryption engine to be able to decrypt the encrypted portions of the encrypted network traffic data unit. In one or more embodiments, the decryption information may provide and/or specify (i) the encryption type used (e.g., MACsec, IPsec ESP), (ii) replay protection, (iii) and/or an ICV for the encrypted network traffic data unit.

In one or more embodiments, the decryption information is broken into two portions (e.g., decryption information A and decryption information B). In one or more embodiments, decryption information A specifies (i) the encryption type used and (ii) the replay protection, whereas decryption information B specifies (iii) the ICV. One of ordinary skill in the art, having the benefit of this Detailed Description, would appreciate that any of (i) the encryption type used, (ii) replay protection, (iii) and/or the ICV may be specified and/or provided by decryption information A and/or decryption information B, or some variation thereof.

In Step 412, the encrypted network traffic data unit is transmitted towards the decryption engine (and/or the network device to which the decryption engine belongs). In one or more embodiments, the decryption engine is specified by the outer forwarding information that was appended to the network traffic data unit prior to encryption (See FIG. 3, Step 306). Further, in one or more embodiments, as the outer forwarding information was not encrypted by the encryption engine, the outer forwarding information is utilized by one or more network devices in the path between the encryption engine and the decryption engine that the encrypted network traffic data unit traverses, in order to ensure that the encrypted network traffic data unit is transmitted to the decryption engine.

In one or more embodiments, the encryption engine transmits the encrypted network traffic data unit through an egress port of the network device into a public network (e.g., the Internet). Accordingly, in one or more embodiments, the only unencrypted (e.g., in-the-clear) portions of the encrypted network traffic data unit are the outer forwarding information and the decryption information.

Figure 5:
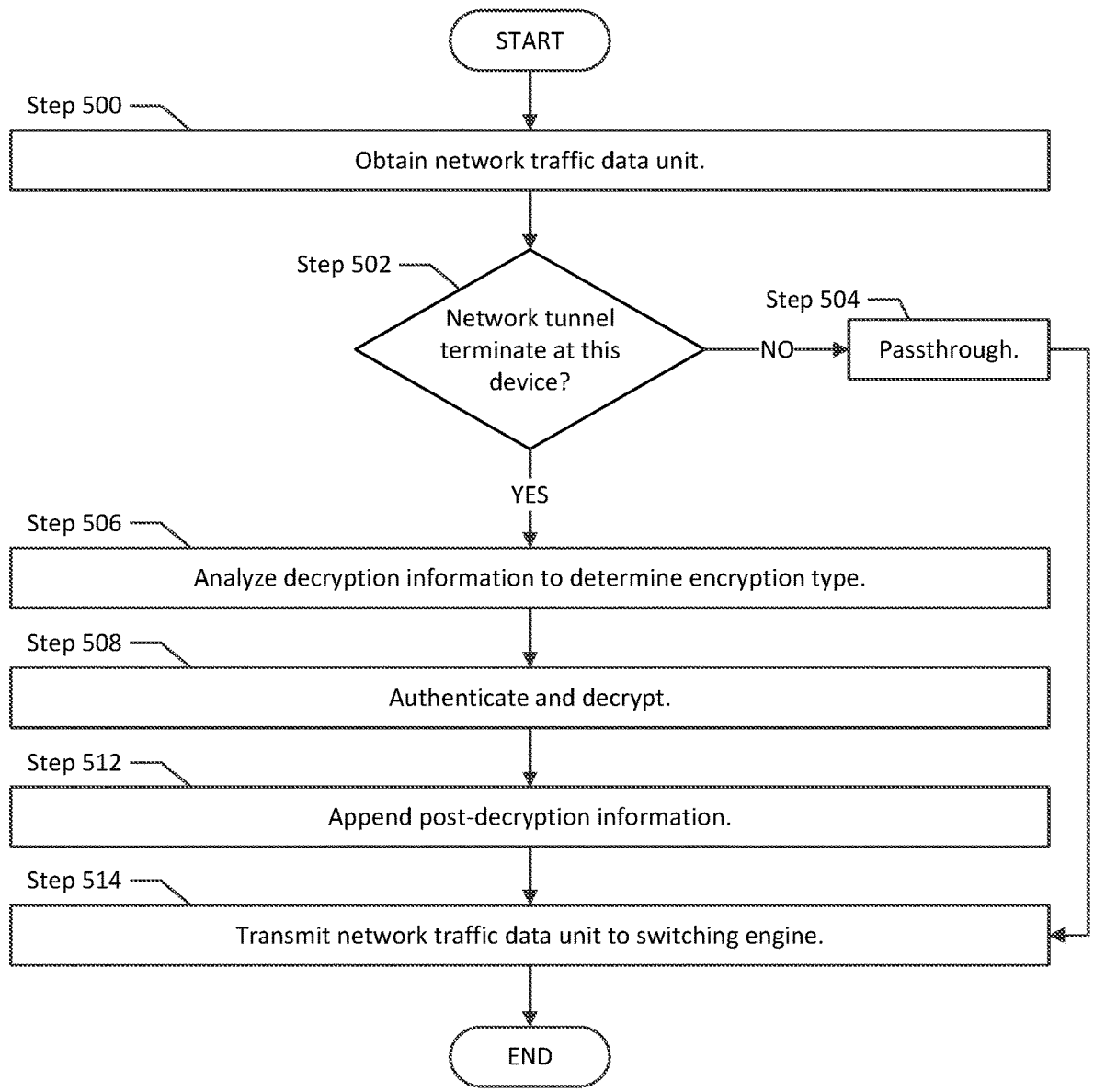
FIG. 5 shows a flowchart in accordance with one or more embodiments.

FIG. 5 shows a flowchart describing the operations performed by a decryption engine on an encrypted network traffic data unit according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 500, a decryption engine obtains a network traffic data unit. In one or more embodiments, the network traffic data unit is an encrypted network traffic data unit, having been previously encrypted by an encryption engine.

Alternatively, in one or more embodiments, the network traffic data unit is not encrypted, having been passed through by the encryption device (See Step 404). In one or more embodiments, the decryption engine is a part of a network device that is operatively connected to a public network (e.g., the Internet), via an ingress port, and the network traffic data unit is received via the ingress port.

In Step 502, a determination is made as to whether the decryption engine (and/or the network device to which the decryption engine belongs) is specified by the outer forwarding information appended to the network traffic data unit. If the outer forwarding information of the network traffic data unit does not specify the decryption engine (or the network device to which the decryption engine belongs) as the network device that terminates the network tunnel, the process proceeds to Step 504. That is, for example, in one or more embodiments, the network device (to which the decryption engine belongs) may be an intermediary network device that acts to relay network traffic data units (encrypted or otherwise) towards a destination.

Alternatively, in one or more embodiments, if the outer forwarding information of the encrypted network traffic data unit does specify the decryption engine (and/or the network device to which the decryption engine belongs) as network device that terminates the network tunnel, the process proceeds to Step 506.

In Step 504, in one or more embodiments, the decryption engine transmits the network traffic data unit towards a destination without modification from the decryption engine. In one or more embodiments, if the outer forwarding information of the network traffic data unit does not indicate the decryption engine (and/or the network device to which the decryption engine belongs), the decryption engine may process the network traffic data unit by transmission to the switching engine without performing decryption. For example, the network device (to which the decryption engine belongs) may merely process the network traffic data unit (encrypted or unencrypted) as ordinary network traffic and transmit the network traffic data unit towards the network traffic data unit's next destination. Alternatively, in one or more embodiments, the decryption engine may be configured to drop any network traffic data unit that does not specify the decryption engine (and/or the network device to which the encryption engine belongs) in the outer forwarding information.

In Step 506, the decryption information appended to the encrypted network traffic data unit is analyzed. In one or more embodiments, as described above in the description of FIG. 2C, decryption information may provide and/or specify (i) the encryption type used (e.g., IPsec ESP, MACsec), (ii) replay protection, (iii) and/or an ICV for the encrypted network traffic data unit. Thus, in one or more embodiments, the decryption information is analyzed to determine the encryption type used.

In Step 508, the decryption engine decrypts the encrypted network traffic data unit based on the decryption information. In one or more embodiments, the decryption engine may also perform other security actions on the encrypted network traffic data unit. For example, the decryption engine may further analyze/utilize the decryption information (appended to the encrypted network traffic data unit by the encryption engine) to ensure that the encrypted network traffic data unit was not maliciously or fraudulently repeated or delayed (e.g., a replay attack). Further the decryption engine may verify that the contents of the encrypted portion of the encrypted network traffic data unit have not been modified (e.g., an integrity check) using the ICV. One of ordinary skill in the art, having the benefit of this Detailed Description, would appreciate that any form of security check may be performed upon the encrypted network traffic data unit to verify the secure transmission and content of the payload. In one or more embodiments, if the decryption engine determines that the encrypted network traffic data unit was subject to a replay attack and/or fails an integrity check, the decryption engine may perform an error action that includes (i) dropping the network traffic data unit, (ii) quarantining the network traffic data unit, (iii) alerting a system administrator, (iv) transmitting the network traffic data unit to a system for further analysis/processing, (v) logging the error in an appropriate log of the network device; and/or (vi) any other appropriate action for processing an erroneous decrypted network traffic data unit.

In one or more embodiments, the decryption engine is able to identify the decryption information appended to the encrypted network traffic data unit and decrypt the encrypted portion. For example, the decryption engine may (i) analyze the decryption information and determine determination that a particular encryption type was utilized (e.g., IPsec ESP and/or MACsec type encryption), (ii) be configured to decrypt the encrypted network traffic data unit, and (iii) proceed to decrypt the payload and any inner forwarding information (if present).

In one or more embodiments, the network device that includes the decryption engine is located inside of a private (e.g., not public) network (e.g., site). Accordingly, in one or more embodiments, there is a presumption that the site that includes the decryption engine is sufficiently secure enough to allow for the encrypted network traffic data unit to be decrypted and transmitted in-the-clear (e.g., unencrypted, decrypted, not encrypted) towards a destination device.

In Step 512, post-decryption information is added to the decrypted network traffic data unit. In one or more embodiments, as described above in the description of FIG. 2D, post-decryption information is data that is appended to a decrypted network traffic data unit after the decryption has occurred. In one or more embodiments, post-decryption information may specify (i) status of encryption (e.g., an indication that the decrypted network traffic data unit was previously encrypted), (ii) the encryption type that was used, (iii) whether the decryption was successful (an error indicator, or absence thereof), and/or (iv) other information about the status of the decrypted network traffic data unit.

In Step 514, the decryption engine transmits the decrypted network traffic data unit to the switching engine of the same network device. Alternatively, based on the determinations made prior to transmission of the network traffic data unit, the network traffic data unit may be transmitted without any modification by the decryption engine (See Step 504).

Figure 6:
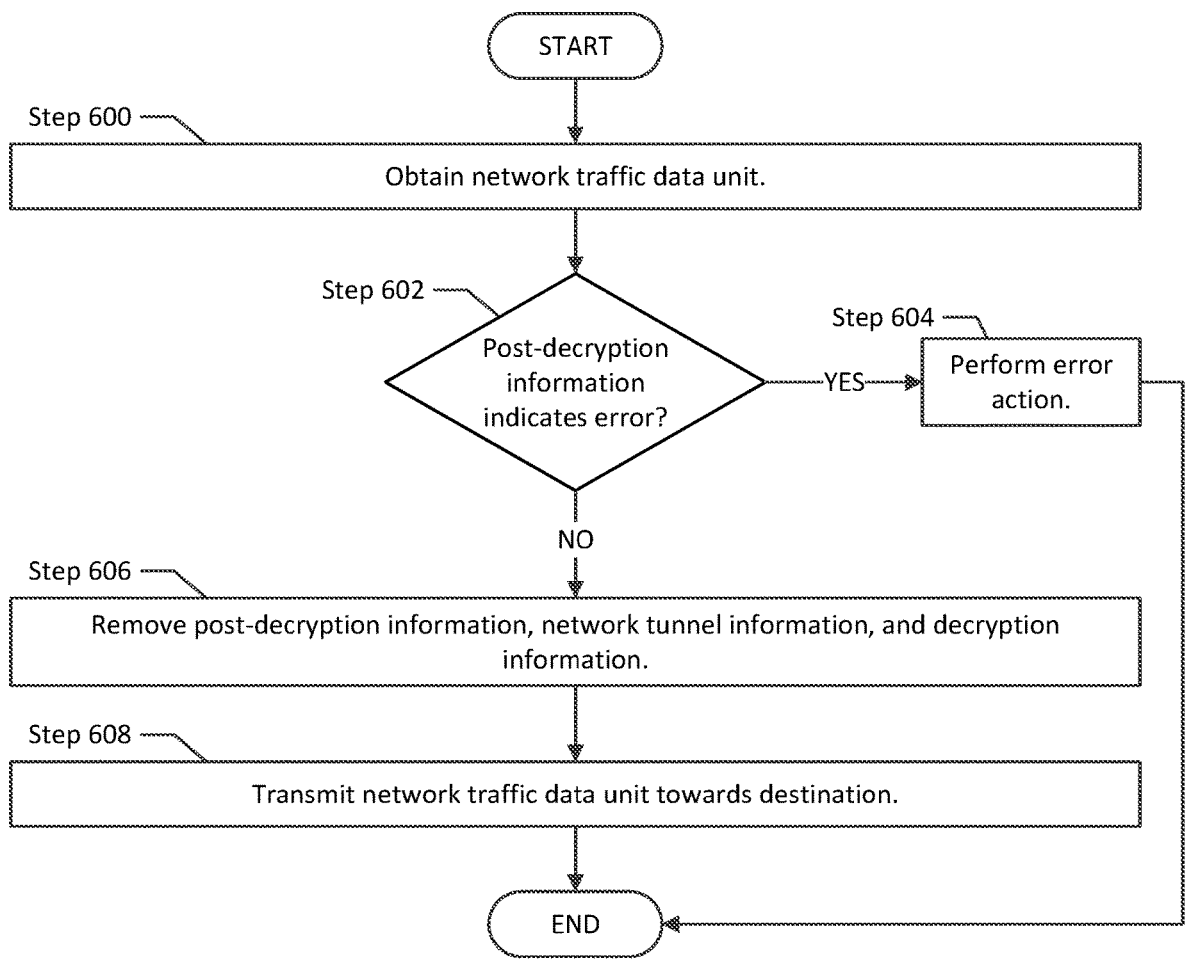
FIG. 6 shows a flowchart in accordance with one or more embodiments.

FIG. 6 shows a flowchart describing the operations performed by a switching engine on a decrypted network traffic data unit according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 600, a switching engine obtains a network traffic data unit. In one or more embodiments, the network traffic data unit was decrypted by the decryption engine prior to being obtained by the switching engine (i.e., a decrypted network traffic data unit) and may additionally include post-decryption information.

Alternatively, in one or more embodiments, the network traffic data unit is obtained unaltered by the decryption engine; and, in such an event, the switching engine processes the network traffic data unit using any relevant one or more actions (e.g., to transmit the network traffic data unit, to drop the network traffic data unit, etc.).

In Step 602, a determination is made as to whether the post-decryption information indicates an error. In one or more embodiments, as described above in the description of FIG. 2D, post-decryption information is data that is appended to a decrypted network traffic data unit after the decryption has occurred. In one or more embodiments, post-decryption information may specify (i) status of encryption (e.g., an indication that the decrypted network traffic data unit was previously encrypted), (ii) the encryption type that was used, (iii) whether the decryption was successful (an error indicator, or absence thereof), and/or (iv) other information about the status of the decrypted network traffic data unit (e.g., whether authentication was successful and/or the network traffic data unit was subject to a replay attack).

In one or more embodiments, if an error is indicated (e.g., decryption failed, authentication failed, malicious activity was identified, data is corrupted, etc.) in the post-decryption information, the process proceeds to Step 604. Alternatively, in one or more embodiments, if the switching engine determines that the post-decryption information does not indicate any error, the process proceeds to Step 606.

In Step 604, the switching engine performs an error action based on the determination that the post-decryption information indicates an error. In one or more embodiments, an error action includes (i) dropping the network traffic data unit, (ii) quarantining the network traffic data unit, (iii) alerting a system administrator, (iv) transmitting the network traffic data unit to a system for further analysis/processing, (v) logging the error in an appropriate log of the network device; and/or (vi) any other appropriate action for processing an erroneous decrypted network traffic data unit.

In Step 606, after determining the post-decryption information does not indicate an error, the switching engine removes the post-decryption information. In one or more embodiments, as the decryption of the encrypted network traffic data unit was determined to be successful (as determined in Step 602), the post-decryption information is no longer necessary for the processing and transmission of the decrypted network traffic data unit. Further, the switching engine removes the network tunnel information (e.g., the outer forwarding information and/or tunnel identifier) and the decryption information. In one or more embodiments, as the decrypted network traffic data unit is fully decrypted and within a secure network device, the decryption information (used to decrypt the encrypted network traffic data unit) and the outer forwarding information (used to traverse the network tunnel) are no longer needed for the processing and forwarding of the decrypted network traffic data unit.

In Step 608, the switching engine transmits the decrypted network traffic data unit towards the decrypted network traffic data unit's destination using the inner forwarding information that is now decrypted (and specifies the destination device as generated by the source device). In one or more embodiments, the switching engine transmits the decrypted network traffic data unit through an egress port (of the network device to which switching engine belongs) operatively connected to the destination device.

In one or more embodiments, the decrypted network traffic data unit is of the same form and includes the same data as when originally generated by the source device; for example, as described above with respect to FIG. 2E, the network traffic data unit is substantially similar to the network traffic data unit of FIG. 2A.

In one or more embodiments, after the network traffic data unit is tagged, encrypted, transmitted through a network tunnel, decrypted, and untagged, the network traffic data unit appears in substantially the same form with substantially the same data as when first generated by the source device. Accordingly, in one or more embodiments, all of the information appended to the network traffic data unit to process and transmit the network traffic data unit is removed prior to arriving at the destination device. Further, in one or more embodiments, all of the processing (e.g., encryption) is reversed or otherwise undone prior to arriving at the destination device.

Figure 7:
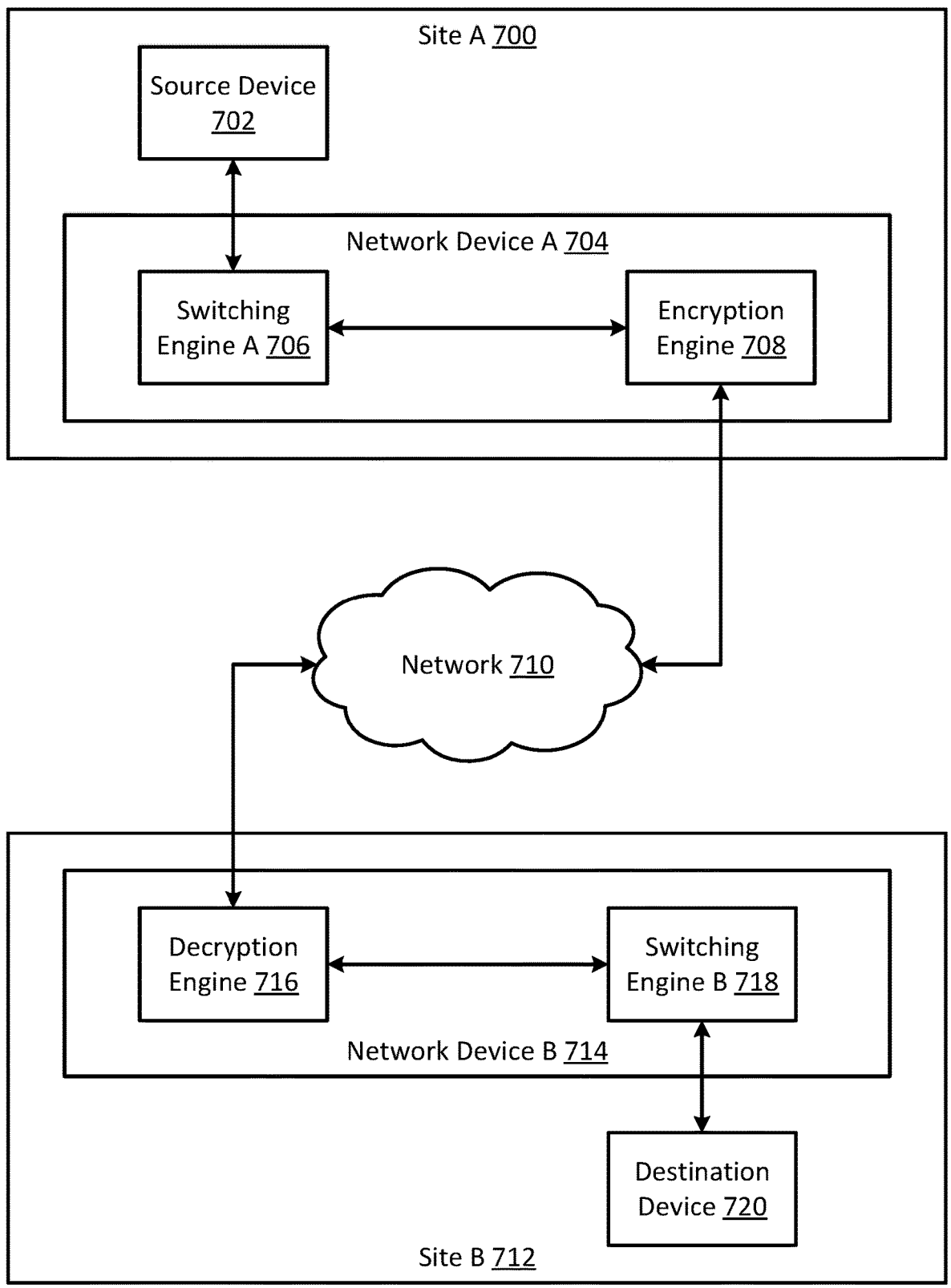
FIG. 7 shows an example in accordance with one or more embodiments.

FIG. 7 shows an example system showing a possible configuration for the transmission, encryption, decryption, and further transmission of a network traffic data unit. The following use case is for explanatory purposes only and not intended to limit the scope to this embodiment. Additionally, while the example shows certain aspects of embodiments described herein, all possible aspects of such embodiments may not be illustrated in this particular example.

Use Case 1

In FIG. 7, consider a scenario in which, a network traffic data unit is generated by a source device (702) inside site A (700) including, at least, a payload. In one or more embodiments, site A (700) is considered a secure private network, and thus the transmission of the network traffic data unit in an unencrypted form (i.e., in-the-clear) is permissible. Further, during or immediately after the generation of the network traffic data unit, the source device (702) appends inner forwarding information to the network traffic data unit identifying the destination device (720) as the destination for the network traffic data unit. Further, the source device (702) transmits the network traffic data unit to network device A (704) of site A (700); and switching engine A (706) of network device A (704) receives the network traffic data unit from the source device (702).

Next, switching engine A (706) performs a lookup using the inner forwarding information appended to the network traffic data unit by the source device (702) to determine the network tunnel through which the network traffic data unit is intended to traverse. Further, once the network tunnel is identified, switching engine A (706) makes a determination that the network traffic data unit must therefore exit network device A (704) through an egress port associated with the identified network tunnel. Accordingly, the switching engine appends outer forwarding information to the network traffic data unit that specifies the network tunnel. Accordingly, the network traffic data unit is appended with outer forwarding information that allows the network traffic data unit to traverse a public network in a particular path (e.g., a tunnel) rather than navigating via routing based on the inner forwarding information.

Next, switching engine A (706) makes a determination that the IP network tunnel (that the network traffic data unit is intended to traverse) requires encryption. That is, in one or more embodiments, switching engine A (706) is configured to identify one or more network tunnels and their associated encryption schemes. In this use case, the IP network tunnel that the network traffic data unit is intended to traverse requires AES-GCM type encryption. Accordingly, switching engine A (706) then appends an SA-tag to the network traffic data unit that identifies the type of encryption to be used. Once the SA-tag is appended to the network traffic data unit, switching engine A (706) then transmits the network traffic data unit to the encryption engine (708).

Next, the encryption engine (708) receives the network traffic data unit (now including a payload, inner forwarding information, an SA-tag, and outer forwarding information). The encryption engine (708) then makes the determination that the SA-tag is valid for the encryption engine (708). That is, in one or more embodiments, the encryption engine (708)

analyses the SA-tag to ensure that the encryption engine (708) is capable of performing the type of encryption specified, and further that the tunnel identified by the SA-tag is operatively connected to the encryption engine such that the encryption engine (708) may transmit the network traffic data unit accordingly.

Next, the encryption engine (708) encrypts the payload and the inner forwarding information. That is, in one or more embodiments, the encryption engine (708) modifies the data of both the payload and inner forwarding information such that the data is rendered unreadable without first being decrypted. Further, as the SA-tag is no longer needed, the encryption engine (708) removes the SA-tag.

Further, once encrypted, the encryption engine (708) appends decryption information to the encrypted network traffic data unit. Specifically, the encryption engine (708) appends two different segments of decryption information. The first segment includes an indication of (i) the encryption type used and (ii) replay protection, whereas the second segment specifies (iii) the ICV. Once the decryption information is appended to the encrypted network traffic data unit, the encryption engine (708) then transmits the encrypted network traffic data unit through an egress port of network device A (704) to network (710).

Network (710), the Internet, then receives the encrypted network traffic data unit with unencrypted outer forwarding information, an encrypted payload, and encrypted inner forwarding information. Network (710) provides an operative connection between network device A (704) and network device B (714). As the outer forwarding information specifies network device B (714) as the device that terminates the tunnel, the operatively connected network devices of network (710) transmits the encrypted network traffic data unit to network device B (714).

Next, network device B (714) (located inside private network, site B (712)) then receives the encrypted network traffic data unit. Specifically, the decryption engine (716) included in network device B (714) obtains the encrypted network traffic data unit. Once obtained, the decryption engine (716) makes a determination that the unencrypted outer forwarding information of the encrypted network traffic data unit specifies network device B (714) as the tunnel termination device. Next, the decryption engine (716) analyzes the decryption information to identify the type of encryption used to encrypt the encrypted network traffic data unit. Once identified, the decryption engine (716) authenticates and decrypts the encrypted network traffic data unit using the decryption information. That is, in one or more embodiments, the decryption engine (716) is able to utilize the decryption information such that encrypted network traffic data unit may be further modified to return the payload and inner forwarding information back to their pre-encryption state (i.e., decrypted).

Next, the decryption engine (716) appends post-decryption information that indicates that decryption was successful. By mere virtue of having the post-decryption information, the switching engine is able to determine that (i) the (decrypted) network traffic data unit was previously encrypted and (ii) that decryption was successful. Thereafter, the decryption engine (716) then transmits the decrypted network traffic data unit to switching engine B (718).

Next, switching engine B (718) obtains the decrypted network traffic data unit. Switching engine B (718) then analyzes the post-decryption information to determine if the post-decryption information indicates an error (in this use case, the post-decryption information does not indicate an error as decryption was successful). Once the determination is made that the post-decryption information does not indicate an error, switching engine B (718) then removes the post-decryption information as the post-decryption information is no longer needed.

After the post-decryption information is removed, switching engine B (718) then reads the decrypted inner forwarding information to identify the destination specified by the inner forwarding information. In this use case, the inner forwarding information specifies destination device (720) as the destination. Accordingly, switching engine B (718) then transmits the decrypted network traffic data unit towards the destination device (720) via an egress port of network device B (714).

Next, the destination device (720) obtains the decrypted network traffic data unit. At the destination device (720), the network traffic data unit arrives with the payload and inner forwarding information as originally generated. All other forwarding information (e.g., the outer forwarding information) and encryption/decryption information is removed prior to the arrival of the decrypted network traffic data unit at the destination device (720). Accordingly, the destination device (720) may utilize the payload for whatever purpose was intended.

One or more embodiments make it possible to encrypt and/or secure network traffic that utilizes certain routing techniques quickly and efficiently using hardware-based configurations. Specifically, in one or more embodiments, network traffic utilizing, for example, an IP routing and tunneling scheme may be processed by a specially configured network device that includes a switching engine and encryption engine configured to rapidly process and encrypt network traffic. Accordingly, as the network traffic is encrypted via a hardware-based solution, little-to-no latency is added to the process and speed is not comprised for security (thus achieving "line rate" or near "line rate" speeds, even when encrypting and decrypting is active). Further, in one or more embodiments, after traversing a public network fully encrypted via a network tunnel, the encrypted traffic may arrive at another specially configured network device that rapidly decrypts and transmits the network traffic towards the destination.

While one or more embodiments have been described herein with respect to a limited number of embodiments and examples, those skilled in the art, having benefit of this disclosure, will appreciate that other embodiments can be devised which do not depart from the scope of the embodiments disclosed herein. Accordingly, the scope should be limited only by the attached claims.

What is claimed is:

1. A method in a first network device for modifying network traffic data, comprising:
   a first switching engine in the first network device:
   obtaining a network traffic data unit;
   performing a lookup, by the first switching engine, to identify a destination using forwarding information contained in the network traffic data unit, and
   making a determination that the network traffic data unit is to traverse a network tunnel based on the destination,
   appending the network tunnel information to the network traffic data unit in response to a determination that the network traffic data unit is to traverse a network tunnel, wherein the network tunnel information indicates one or more of: (i) a port through which the network traffic data unit is intended to be transmitted out of the network device, (ii) an encryption engine for transmitting the network traffic data unit, and (iii) outer forwarding information that specifies a path through the network tunnel and/or a destination device that terminates the network tunnel;

making a determination that encryption of the network traffic data unit is required based at least on the network tunnel information;

generating encryption information, by the first switching engine, in response to a determination that encryption of the network traffic data unit is required, wherein the encryption information specifies an encryption type, an encryption key, and a portion of the network traffic data unit to encrypt;

appending the encryption information to the network traffic data unit;

prior to transmitting the network traffic data unit, securing the network traffic data unit, by an encryption engine in the first network device, using the encryption information appended to the network traffic data unit to create an encrypted network traffic data unit, wherein securing the network traffic data unit comprises:

encrypting a portion of the network traffic data unit specified in the encryption information in accordance with the encryption type and the encryption key specified in the encryption information;

removing the encryption information from the network traffic data unit; and appending decryption information to the encrypted network traffic data unit; and transmitting the encrypted network traffic data unit through the network tunnel, based on the network tunnel information, to the identified destination.

2. The method of claim 1, wherein the network tunnel information indicates termination at a device that comprises a decryption engine.

3. The method of claim 1, further comprising:

receiving the encrypted network traffic data unit, by a decryption engine, comprising:
the network tunnel information; and
decryption information, wherein the decryption information specifies the encryption type;

obtaining, by the decryption engine, the encryption type;

decrypting, by the decryption engine, the encrypted network traffic data unit to obtain a decrypted network traffic data unit, based on the encryption type;

generating post-decryption information based on the decrypting;

appending, by the decryption engine, the post-decryption information to the network traffic data unit;

transmitting the decrypted network traffic data unit to a second switching engine;

determining, by the second switching engine, that decrypting the encrypted network traffic data unit was successful based on the post-decryption information;

converting, by the second switching engine, the decrypted network traffic data unit into a converted network traffic data unit; and transmitting, by the second switching engine, the converted network traffic data unit to a destination device.

4. The method of claim 3, wherein obtaining the encryption type comprises:

determining that the network tunnel information specifies a device that comprises the decryption engine; and
performing an analysis on the decryption information to obtain the encryption type.

5. The method of claim 4, wherein decrypting the encrypted network traffic data unit comprises:

modifying the encrypted network traffic data unit based on the encryption type; and
authenticating a payload of the encrypted network traffic data unit.

6. The method of claim 3, wherein the second switching engine and the decryption engine are both hardware components of a second network device.

7. A system for modifying network traffic data, comprising:

a first network device comprising a first switching engine, configured to:
obtain a network traffic data unit;
perform a lookup using forwarding information contained in the network traffic data unit to identify a destination, and
make a determination that the network traffic data unit is to traverse a network tunnel based on the destination,
append the network tunnel information to the network traffic data unit in response to a determination that the network traffic data unit is to traverse a network tunnel, wherein the network tunnel information indicates one or more of: (i) a port through which the network traffic data unit is intended to be transmitted out of the network device, (ii) an encryption engine for transmitting the network traffic data unit, and (iii) outer forwarding information that specifies a path through the network tunnel and/or a destination device that terminates the network tunnel;
make a determination that encryption of the network traffic data unit is required based at least on the network tunnel information;
generate encryption information based on the network tunnel information, wherein the encryption information specifies an encryption type, an encryption key, and a portion of the network traffic data unit to encrypt;
append the encryption information to the network traffic data unit;
secure the network traffic data unit, prior to transmitting the network traffic data unit, based on the encryption information to create an encrypted network traffic data unit, including:
encrypting a portion of the network traffic data unit specified in the encryption information in accordance with the encryption type and the encryption key specified in the encryption information;
removing the encryption information from the network traffic data unit; and
appending decryption information to the encrypted network traffic data unit; and
transmit the encrypted network traffic data unit through a network tunnel based on the network tunnel information, to the identified destination.

8. The system of claim 7, wherein the analysis comprises:
performing a lookup to identify a destination; and
determining that the network traffic data unit is to traverse a network tunnel based on the destination,
wherein the network tunnel information indicates termination at a device that comprises a decryption engine.

9. The system of claim 7, wherein securing the network traffic data unit comprises:

determining that the encryption information is valid;
modifying the network traffic data unit based on the encryption type; and
after the modifying:

removing the encryption information from the network traffic data unit; and appending decryption information to the network traffic data unit.

10. The system of claim 7, further comprising:

a second network device comprising:
   a decryption engine, configured to:
      receive the encrypted network traffic data unit, comprising:
         the network tunnel information; and
         decryption information, wherein the decryption information specifies the encryption type;
      obtain the encryption type based on the decryption information;
      decrypt the encrypted network traffic data unit to obtain a decrypted network traffic data unit, based on the encryption type;
      generate post-decryption information based on the decrypted network traffic data unit;
      append the post-decryption information to the network traffic data unit; and
      transmit the decrypted network traffic data unit to a second switching engine, and
   the second switching engine, configured to:
      determine that decrypting the encrypted network traffic data unit was successful;
      convert the decrypted network traffic data unit into a converted network traffic data unit; and
      transmit the converted network traffic data unit to a destination device.

11. The system of claim 10, wherein obtaining the encryption type comprises:
   determining that the network tunnel information specifies a device that comprises the decryption engine; and
   performing an analysis on the decryption information to obtain the encryption type.

12. The system of claim 11, wherein decrypting the encrypted network traffic data unit comprises:
   modifying the encrypted network traffic data unit based on the encryption type; and
   authenticating a payload of the encrypted network traffic data unit.

13. The system of claim 10, wherein the switching engine and the decryption engine are both hardware components of the second network device.

14. A non-transitory computer-readable storage device in a network device having stored thereon computer executable instructions, which when executed by a computer in the network device, cause the computer to:
   obtain a network traffic data unit;
   perform a lookup using forwarding information contained in the network traffic data unit to identify a destination, and
   make a determination that the network traffic data unit is to traverse a network tunnel based on the destination,
   append the network tunnel information to the network traffic data unit in response to a determination that the network traffic data unit is to traverse a network tunnel, wherein the network tunnel information indicates one or more of: (i) a port through which the network traffic data unit is intended to be transmitted out of the network device, (ii) an encryption engine for transmitting the network traffic data unit, and (iii) outer forwarding information that specifies a path through the network tunnel and/or a destination device that terminates the network tunnel;
   make a determination that encryption of the network traffic data unit is required based at least on the network tunnel information;
   generate encryption information in response to a determination that encryption of the network traffic data unit is required, wherein the encryption information specifies an encryption type, an encryption key, and a portion of the network traffic data unit to encrypt;
   append the encryption information to the network traffic data unit;
   prior to transmitting the network traffic data unit, secure the network traffic data unit using the encryption information appended to the network traffic data unit to create an encrypted network traffic data unit, wherein securing the network traffic data unit comprises:
      encrypting a portion of the network traffic data unit specified in the encryption information in accordance with the encryption type and the encryption key specified in the encryption information;
      removing the encryption information from the network traffic data unit; and
      appending decryption information to the encrypted network traffic data unit; and
   transmit the encrypted network traffic data unit through the network tunnel based on the network tunnel information, to the identified destination.

15. The non-transitory computer-readable storage device of claim 14, wherein the network tunnel information indicates termination at a device that comprises a decryption engine.

16. The non-transitory computer-readable storage device of claim 14, wherein the computer executable instructions, which when executed by the computer, further cause the computer to append decryption information to the encrypted network traffic data unit.

17. The non-transitory computer-readable storage device of claim 14, wherein the computer executable instructions, which when executed by the computer, further cause the computer to:
   receive the encrypted network traffic data unit comprising:
      the network tunnel information; and
      decryption information, wherein the decryption information specifies the encryption type;
   obtain the encryption type;
   decrypt the encrypted network traffic data unit to obtain a decrypted network traffic data unit, based on the encryption type;
   generate post-decryption information based on the decrypting;
   append the post-decryption information to the network traffic data unit; and
   transmit the decrypted network traffic data unit to a switching engine, wherein the switching engine:
      determines that decrypting the encrypted network traffic data unit was successful based on the post-decryption information;
      converts the decrypted network traffic data unit into a converted network traffic data unit; and
      transmits the converted network traffic data unit to a destination device.

18. The non-transitory computer-readable storage device of claim 17, wherein obtaining the encryption type comprises performing an analysis on the decryption information to obtain the encryption type.

19. The non-transitory computer-readable storage device of claim 18, wherein decrypting the encrypted network traffic data unit comprises:
   modifying the encrypted network traffic data unit based on the encryption type; and
   authenticating a payload of the encrypted network traffic data unit.

* * * * *